US009457490B2

(12) United States Patent
Öberg et al.

(10) Patent No.: US 9,457,490 B2
(45) Date of Patent: Oct. 4, 2016

(54) WIRE SAW

(75) Inventors: Lars Öberg, Nora (SE); Hiroshi Takeuchi, Tokyo (JP)

(73) Assignee: HUSQVARNA AB, Huskvarna (SE)

( * ) Notice: Subject to any disclaimer, the term of this patent is extended or adjusted under 35 U.S.C. 154(b) by 1130 days.

(21) Appl. No.: 13/319,070

(22) PCT Filed: Jan. 7, 2010

(86) PCT No.: PCT/SE2010/050009
§ 371 (c)(1),
(2), (4) Date: Feb. 6, 2012

(87) PCT Pub. No.: WO2010/128925
PCT Pub. Date: Nov. 11, 2010

(65) Prior Publication Data
US 2012/0272942 A1    Nov. 1, 2012

(30) Foreign Application Priority Data
May 4, 2009    (WO) ................. PCT/SE2009/050481

(51) Int. Cl.
*B23D 57/00*    (2006.01)
*B28D 1/08*    (2006.01)
(52) U.S. Cl.
CPC ........... *B28D 1/088* (2013.01); *B23D 57/0053* (2013.01); *B23D 57/0069* (2013.01); *Y10T 29/49716* (2015.01)
(58) Field of Classification Search
CPC ............. B28D 1/088; B28D 57/0053; B28D 57/0069; Y10T 29/49716
USPC .......................................... 125/21; 83/651.1
See application file for complete search history.

(56) References Cited

U.S. PATENT DOCUMENTS

| 4,735,188 A | * | 4/1988 | Kubo ............................... 125/21 |
| 4,765,307 A | * | 8/1988 | Kubo ............................... 125/21 |
| 5,060,628 A | | 10/1991 | Ishida |
| 5,472,262 A | * | 12/1995 | Buyens et al. .................. 299/15 |
| 5,645,040 A | * | 7/1997 | Bieri jun. ......................... 125/21 |
| 5,839,425 A | | 11/1998 | Toyama et al. |
| 5,875,771 A | * | 3/1999 | Plattner ........................... 125/21 |
| 5,887,579 A | | 3/1999 | Eriksson et al. |
| 6,463,922 B2 | * | 10/2002 | Petitjean ......................... 125/21 |

(Continued)

FOREIGN PATENT DOCUMENTS

DE    29805457 U1    7/1998
DE    29805157 U1    9/1998

(Continued)

OTHER PUBLICATIONS

KTR Catalog—Rotex GS, dated Feb. 13, 2007.*

(Continued)

*Primary Examiner* — Joseph J Hail
*Assistant Examiner* — Marc Carlson
(74) *Attorney, Agent, or Firm* — Nelson Mullins Riley & Scarborough LLP

(57) ABSTRACT

The invention relates to a wire saw having a saw wire drive sheave (2) for driving an endless saw wire, a motor having a motor output shaft directly or indirectly connected to the drive sheave (2) characterized in a at least one torsion suspension device (27), between the motor output shaft and the drive sheave (2), for dampening or absorbing torsion jerk/s to or from the endless saw wire (1).

22 Claims, 14 Drawing Sheets

(56) References Cited

U.S. PATENT DOCUMENTS

| | | | |
|---|---|---|---|
| 6,510,774 B1 * | 1/2003 | Steiner | 83/200.1 |
| 6,772,750 B2 * | 8/2004 | Plattner et al. | 125/21 |
| 6,955,167 B2 | 10/2005 | Baratta | |
| 8,651,098 B2 * | 2/2014 | Shae et al. | 125/21 |
| 2003/0172791 A1 * | 9/2003 | Bieri | 83/651.1 |
| 2006/0189258 A1 | 8/2006 | Schaer et al. | |
| 2006/0201492 A1 | 9/2006 | Baratta et al. | |
| 2007/0163492 A1 | 7/2007 | Michelbrink et al. | |

FOREIGN PATENT DOCUMENTS

| | | | | | |
|---|---|---|---|---|---|
| DE | 102004012023 A1 * | 10/2005 | | | B23D 57/00 |
| DE | 102004012023 B4 | 6/2007 | | | |
| EP | 0904907 A2 | 3/1999 | | | |
| JP | 61086549 A | 5/1986 | | | |
| JP | H0623709 U | 3/1994 | | | |
| JP | 06254838 A * | 9/1994 | | | B28D 1/08 |
| JP | H07158290 A | 6/1995 | | | |
| JP | H09109138 A | 4/1997 | | | |
| JP | 200061808 A | 2/2000 | | | |
| JP | 3064270 B2 | 7/2000 | | | |
| JP | 2001113519 A * | 4/2001 | | | B28D 1/08 |
| JP | 2002113652 A * | 4/2002 | | | B24B 27/06 |
| JP | 2004358833 A * | 12/2004 | | | B28D 1/08 |
| WO | 2008130304 A1 | 10/2008 | | | |
| WO | WO 2008130304 A1 * | 10/2008 | | | B28D 7/00 |

OTHER PUBLICATIONS

JPH06254838A, Sep. 1994—English translation of Japanese Patent from Espacenet.*
International Search Report, International Application No. PCT/SE2010/050009, May 6, 2010, pp. 1-7.
Written Opinion of the International Searching Authority, International Application No. PCT/SE2010/050009, May 7, 2010, pp. 1-9.
International Search Report and Written Opinion in the counterpart patent application No. PCT/SE2009/050481 mailed Dec. 1, 2009.
International Preliminary Report on Patentability in the coutnerpart patent application No. PCT/SE2010/050009 issued Nov. 9, 2011.
International Preliminary Report on Patentability in the counterpart patent application No. PCT/SE2009/050481 issued Nov. 9, 2011.

* cited by examiner

Fig. 9

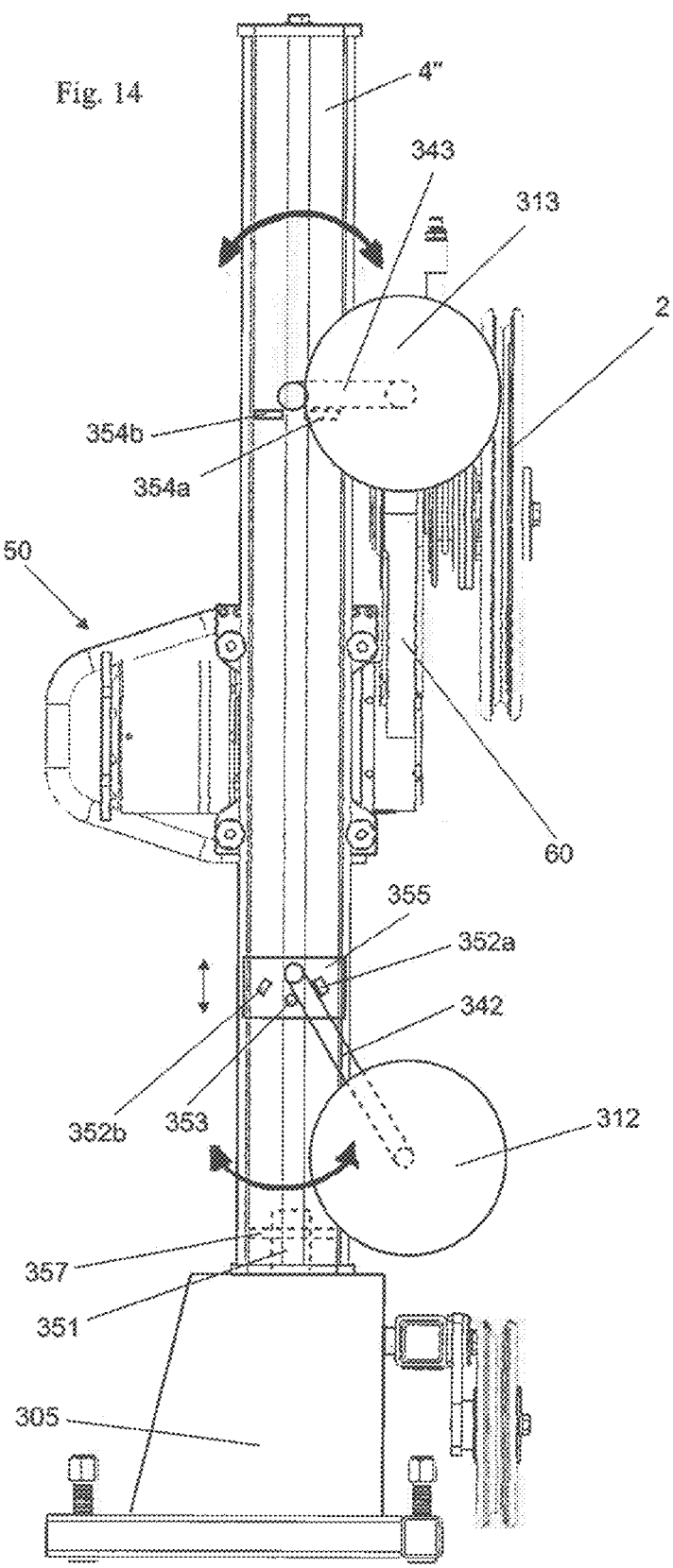

WIRE SAW

TECHNICAL FIELD

The present invention relates to a wire saw having a saw wire drive sheave for driving an endless saw wire, a motor having a motor output shaft directly or indirectly connected to the drive sheave.

In the present context, a sheave is a wheel with a groove along its edge for holding a saw wire, and a saw wire uses diamond-impregnated beads on a cable.

BACKGROUND ART

Construction machinery is used in renovating, reconstructing and extending buildings, for example. Wall saws are used for cutting and extending openings for doors, windows and light wells, etc., corrective work on facades, partition walls and garden walls, etc., and controlled demolition of concrete. Wall saws and similar construction machinery have a prime mover, such as a motor, and a rotary tool driven by the motor. In a wall saw, the tool is a circular saw blade equipped with cutting diamonds. Generally, heavy duty wall saws are driven hydraulically, see U.S. Pat. No. 6,955,167 B2, US 2006/0201492 A1, US 2007/0163492 A1, and U.S. Pat. No. 5,887,579, for example. However, hydraulic wall saws are comparatively heavy and not easy to set up, and comparatively low-weight electric wall saws, such as the one disclosed in US 2006/0189258 A1, for example, have been introduced on the market.

For certain tasks, wire saws are preferable over wall saws. As an example, they can make a cut much thinner than a blade-based saw is capable of. They can also cut through much thicker objects than a blade based saw is capable of, since the maximum depth of the cut is set by the radial distance between the periphery of the saw blade and its hub.

When operating a wire saw tension variations, e.g. whips or jerks in the wire, may increase wear of the wire, shorten its life length, and possibly affect other components of the wire saw negatively. Furthermore, sawing performance may be decreased. Such tensions may occur when the saw wire comes into contact with an area of other density or hardness in the object to be sawed than surrounding areas, e.g. stones or reinforcement bars in concrete.

In U.S. Pat. No. 5,472,262, guide pulleys are provided with suspensions to dampen vibrations and whip in the associated wire saw during the cutting operation. However, it would be advantageous if jerks and whips could be counteracted in a more efficient manner.

Furthermore, for some construction contractors it would be advantageous to have a single machine, which by dismounting some components from one version of the machine and installing other components from an accessory kit easily could be converted to another version, e.g. a wall saw into a wire saw and the other way round.

DE 298 05 157 U1, DE 298 05 457 U1, and EP 0 904 907 are further examples of wire saws.

Furthermore it would be advantageous with a wire saw that can saw close to corners, regardless if they are left or right corners.

SUMMARY OF THE INVENTION

One object of the invention is to provide a wire saw, which can provide for a comparably smooth operation and which is capable of handling whips and jerks in the saw wire during operation of the saw.

In a wire saw of the kind referred to in the first paragraph above, this object is achieved in accordance with the invention in that said wire saw have at least one torsion suspension device between the motor output shaft and the drive sheave for dampening or absorbing jerk/s to or from the endless saw wire. Such a torsion suspension device has been found to dampen jerks/whips in the saw wire and evening out tension variations, which provides for a softer feeding and a more even cut surface, reducing wear reducing wear, and increasing the life length of the saw wire as well as for transmission- and motor components. The better feeding control results in more controllable sawing from low to maximum power output. Further the dampening is active regardless of which particular guide or storage sheaves are used, the number of guide or storage sheaves in use, and which directions the drive sheave is rotating. Start of the motor is also made easier. In addition to performing its function as wire saw it can be rebuilt easily to a wall saw, and the other way round.

Preferably, the motor output shaft is connected to a transmission which has a transmission output shaft that is connected to the drive sheave via a first of the at least one torsion suspension device. By having the torsion suspension device located between the transmission output shaft and the drive sheave, the jerks/or whips are dampened before reaching the transmission, which could reduce wear of components therein.

Alternatively or complementary, the torsion suspension device could be arranged to connect the motor output shaft to a first gear wheel or pulley of the transmission, and/or to connect a last gear wheel or pulley of the transmission to the transmission output shaft. Preferably, the torsion suspension device is an elastic coupling including a inner torsion suspension coupling member, a coaxial surrounding outer torsion suspension coupling member, and at least one elastic torsion suspension element, between the inner torsion suspension coupling member and the outer torsion suspension coupling member, which at least one elastic torsion suspension element, upon rotation of the inner torsion suspension coupling member in relation to the coaxial surrounding outer torsion suspension coupling member becomes more squeezed between the two torsion suspension coupling members and tries to move them back to a neutral position, i.e. a position having a minimum elastic torsion suspension element squeeze. More preferably, the inner torsion suspension member has cross section with squared outer shape and the outer torsion suspension member has a has cross section with squared inner shape, the squared outer shape of the inner torsion suspension member is rotated 45° in relation to the squared inner shape of the outer torsion suspension member, and wherein the at least one elastic torsion suspension element are provided in each one of four spaces formed between the two torsion suspension coupling members. Such a coupling provides a coupling which can be used in a dust laden environment.

Alternatively, the torsion suspension device could be other kinds of elastic couplings, e.g. a spring biased coupling, or other kinds of couplings including rubber elements being squeezed.

Another object of the present invention is to provide a wire saw having a wire storage that can be handled with few interruptions during the sawing process, and which is compact and in addition to performing its function as wire saw can be rebuilt easily to a wall saw, and the other way round.

This object is achieved by a wire saw having a saw wire drive sheave for driving an endless saw wire, a motor for driving the drive sheave, and a track for carrying the motor, the track rising from a base and forming therewith a stand assembly, and the motor and the drive sheave being displaceable along the track as the saw wire is cutting, a plurality of saw wire storage sheaves mounted to form a storage for the saw wire, the storage including at least one displaceable storage sheave and at least one fixed storage sheave. Said at least one displaceable storage sheave is directly or indirectly attached to the track and displaceable in an essentially axial direction of the track for adjusting a length of saw wire in the storage, and the saw wire wraps all of the storage sheaves of the storage during all sawing operations, so that the wire never is transferred to wrap another storage sheave and thereby increase the length of saw wire in the storage. Rethreading is thereby avoided. Moving the at least one displaceable storage sheave can relatively simply be made partly or fully automatic. Such a wire saw is compact and be handled with few interruptions during the sawing process. In addition to performing its function as wire saw can be rebuilt easily to a wall saw, and the other way round.

Preferably, said at least one displaceable storage sheave is one of a pair of storage sheaves mounted side by side and together displaceable in an essentially axial direction of the track, said at least one fixed storage sheave is one of two other storage sheaves that are at least indirectly connected to the base, and said displaceable pair of storage sheaves is located essentially above the two fixed storage sheaves. This means that three loops of wire are used. Thereby, the height of the wire saw necessary for creating a sufficiently large saw wire storage may be reduced, which is an important advantage. Alternatively a bigger wire storage could be used.

If desired, said at least one displaceable storage sheave may be fixed at least indirectly to the motor and thereby indirectly to the track for travelling with the motor along the track. Thereby, the sawing may be continued for an extended period of time without interruption. With many conventional wire saws, the sawing must be interrupted when the motor has arrived at the end of the track, then the motor must be returned to its starting point and the at least one displaceable storage sheave must be displaced toward the end of the track to tension the slack of the saw wire, whereafter the sawing can be continued. Usually this has to be repeated more than once. If said at least one displaceable storage sheave is fixed at least indirectly to the motor for travelling therewith along the track, the travelling speed of the motor will be reduced to about a third of the normal one to maintain the desired tension in the saw wire by accumulating in the storage the additional wire length created by the saw wire cutting through the object to be sawed.

Suitably, the displacement of the motor together with the drive sheave and said at least one displaceable storage sheave along the track is controlled by the tension in the saw wire.

In an alternative but less preferred embodiment, said at least one displaceable storage sheave is one of a pair of storage sheaves mounted side by side and together displaceable in an essentially axial direction of the track, said at least one fixed storage sheave is one of at least two other storage sheaves that are at least indirectly connected to the track at an upper position thereof, and said displaceable pair of storage sheaves is located essentially below the at least two fixed storage sheaves. Also this embodiment reduces the height of the wire saw.

Preferably, said at least one displaceable storage sheave is manually displaceable for attachment in an arbitrary position along the track.

Optionally said at least one displaceable the storage sheave is mounted on a shaft carried by an arm, which is pivotally and at least indirectly attached to the track adjustably in a direction along the track for adjusting a length of saw wire in the storage, and which is biased toward a neutral position, so as to reduce possible tension variations in the saw wire. The expression "at least indirectly" shall be interpreted to include the alternatives of attachment to the track for manual displacement along the track and attachment to the motor for travelling therewith along the track. The arm is preferably resiliently and at least indirectly connected to the track by a coupling including at least one elastic rubber element, which upon rotation of an inner coupling member in relation to a coaxial outer coupling member becomes elastically squeezed between to two coupling members and tries to move them back to a starting position.

To permit the use of a comparatively long saw wire while maintaining the compact design of the saw wire storage, it is preferred that a pair of the storage sheaves is mounted side by side on the arm, and two other storage sheaves are at least indirectly connected to the base at a distance from said pair and at an angle to each other and to a rotation plane of the storage sheave pair.

To make it possible for the storage to accommodate a greater length of saw wire, it is also preferred that said at least one displaceable storage sheave is displaceable along a major portion of the length of the track. This major portion may be either an upper or a lower portion of the track.

Alternatively the wire saw has a wire storage including at least one fixed upper storage sheave and at least one fixed lower storage sheave arranged below the at least one upper storage sheave on the stand assembly. The wire being rethreaded in the storage as the sawing process proceeds.

Preferably, the wire saw have at least two guide sheaves carried by the stand assembly, one for guiding the saw wire at a position between the drive sheave and an object to be sawed, and the other for guiding the saw wire at a position between the object to be sawed and the saw wire storage.

Preferably, the at least one guide sheave is mounted on a pivotable guide sheave arm, which can be pivoted at least 120 degrees, more preferably 360 degrees, in a plane essentially parallel to the plane of the drive sheave. This enables the guide sheaves to be arranged at many different positions.

Preferably, the transmission is housed in a pivotable arm which can be pivoted at least 180 degrees around a pivot which is essentially coaxial with the motor output shaft, preferably 360 degrees. This facilitates changing from a left-hand configuration of the wire saw to a right hand configuration and vice versa, which facilitate sawing close to walls in corners regardless if they are right or left handed.

Preferably, the track has a rack side to which the motor is attached to be movable along and a clamping side to which the storage sheaves can be directly or indirectly secured to, the rack side and the clamping side both being symmetrical. This also facilitates changing from a left-hand configuration of the wire saw to a right hand configuration and vice versa.

Preferably, the motor is of a kind that can operate at both driving directions, preferably an electric motor where the poles are shifted to change driving direction. This also facilitates changing from a left-hand configuration of the wire saw to a right hand configuration and vice versa.

Preferably the track is arranged to be patched to the base into at least two different positions, a first in which the rack side facing to the left and the clamping side to the right, and a second in which the rack side facing to the right and the clamping side to the left.

According to another object of the invention a method is proposed to reconfiguring a wire saw including:
- a track rising from a base and forming therewith a stand assembly,
- a drive unit including a saw wire drive sheave for driving an endless saw wire, and a motor being connected to drive the drive sheave. The drive unit being displaceable attached to a rack side of the track so that the drive unit can move along the track as the saw wire is cutting.
- a storage for the saw wire including an upper sheave holder holding at least one upper storage sheave, being attached to an upper portion of the track at a clamping side opposite to the rack side and protruding from the clamping side at a first side thereof, and a lower sheave holder holding at least one lower storage sheave, being attached to a lower portion of the stand assembly at the opposite side, and protruding from the clamping side at a first side thereof.

The method characterized by the steps:
- unthreading the saw wire from the drive sheave and any engaging storage sheaves;
- arranging the drive unit upside down on the rack side,
- arranging the storage sheave holders to protrude from the clamping side at an opposite second side thereof, and
- turning the track 180 degrees around is longitudinal axle in relation to the base, and
- rethreading the saw wire to the drive sheave and optionally to engage one or more storage sheaves depending on needed wire length.

Preferably, the drive unit includes a pivotable arm connecting the motor to the drive sheave, the pivotable arm extending in a first direction essentially parallel to the track before arranging the drive unit upside down and after arranging the drive unit upside down in an opposite second direction, still essentially parallel to the track, and wherein the method comprising the step of pivoting the pivotable arm from the second position so that it again points in the first direction.

Preferably, the motor is run in an opposite direction after being re-configured.

Further features characterizing the invention and what is obtained thereby will be obvious from the detailed description below and the appended drawings.

BRIEF DESCRIPTION OF THE DRAWINGS

In the following, the invention will be described in more detail with reference to preferred embodiments and the appended drawings.

FIG. 9 is a front view of the third embodiment being in an intermediate sawing position.

FIG. 14 shows a side view of the wire saw according to a fourth embodiment.

MODE(S) FOR CARRYING OUT THE INVENTION

Figure 1:
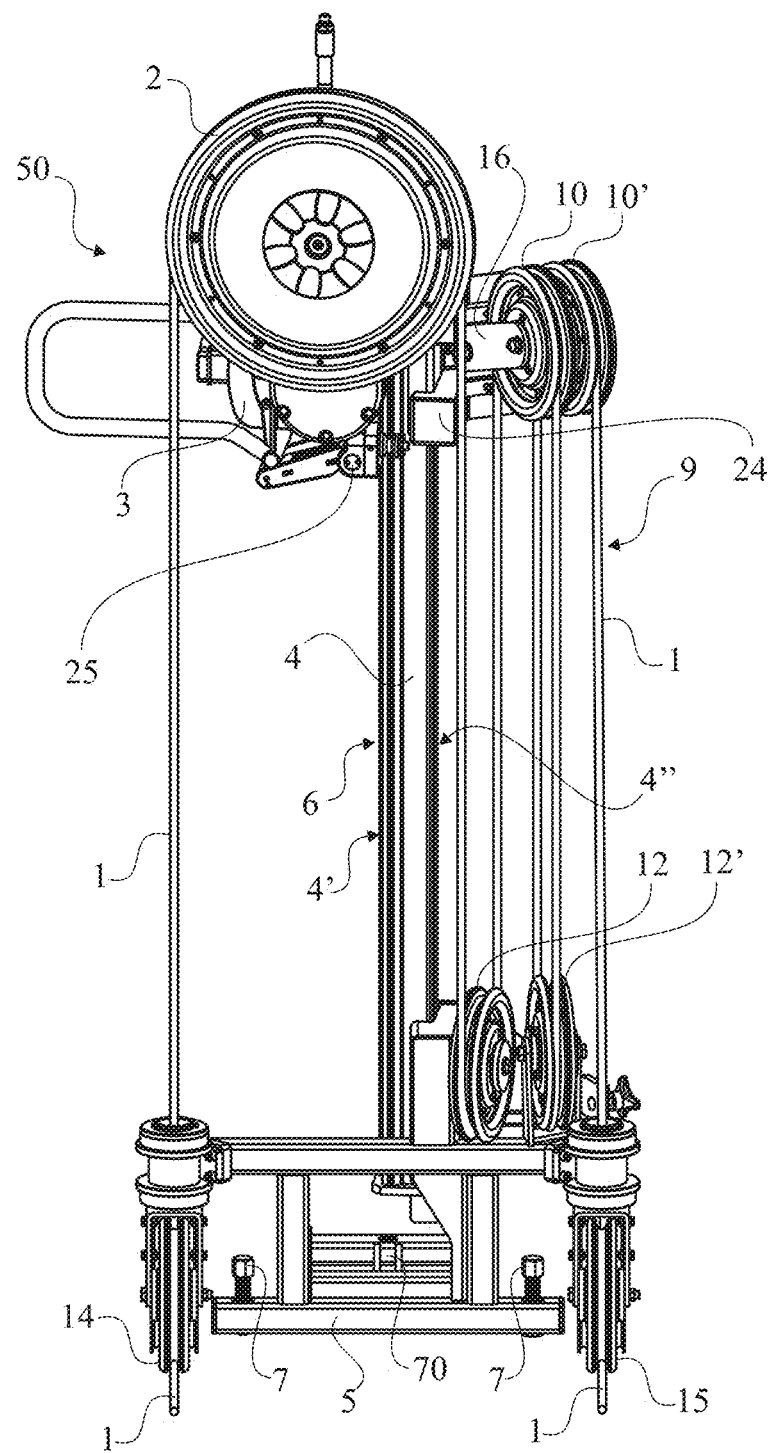
FIG. 1 is a front view of an embodiment of a wire saw in accordance with a first embodiment and having a saw wire storage with at least one displaceable storage sheave located above at least one fixed storage sheave.

In general, a wire saw has a drive unit 50, and a track 4, along which drive unit 50 is displaceable as the saw blade is cutting. The drive unit 50 including a saw wire drive sheave 2, a motor 3 for driving the drive sheave 2, a transmission 28 housed in a pivotable arm 60 that connects to the motor 3 to the drive sheave 2. A motor carriage 25 holds the motor 3. The motor 3 can be engaged and disengaged from the motor carriage 25 via a quick connection as found in the wall saw model Husqvarna 440 HF by Husqvarna AB.

Figure 3:
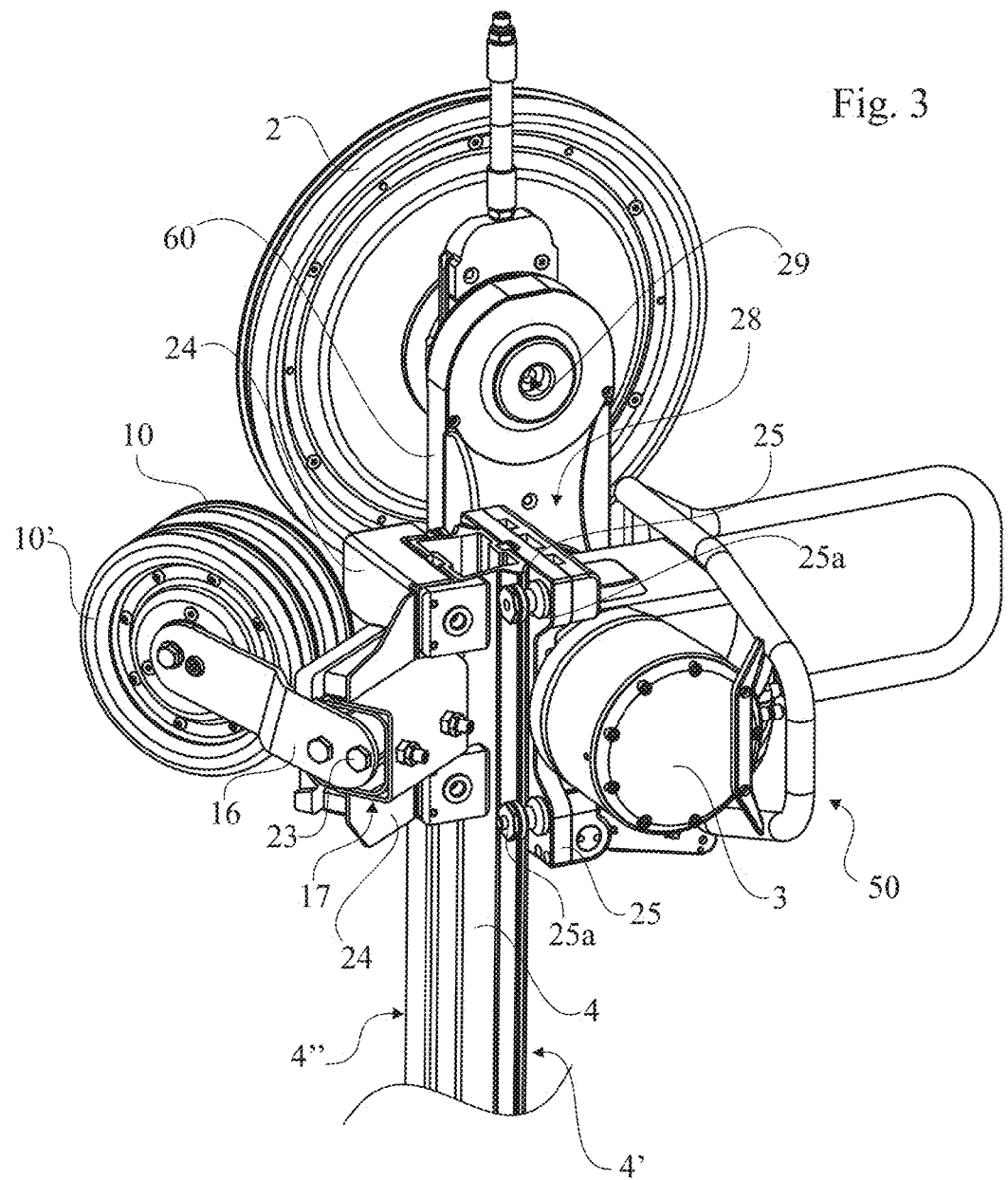
FIG. 3 is a perspective view of a top portion of the wire saw of FIG. 1 with the saw wire removed for greater clarity, but viewed at an angle from above and behind.

The track 4 is mounted to rise from a base 5; 205; 305 and forms therewith a stand assembly 6. The track has a rack side 4' including a centrally placed toothed rack, and an opposite dove-tailed clamping side 4". As best seen in FIG. 3 the motor carriage 25 has 4 rollers 25a, two hidden, for rolling along the rack side 4'. If desired, the motor 3 both rotates the saw blade and displaces itself along the track 4, preferably through a pinion gear (not shown) that engages the rack on the rack side 4'. However, it is also possible to use one motor for the rotation of the drive sheave 2 and another one for the displacement along the track 4. Both sides are symmetrical, i.e. the front and the back portions of them having the same cross section. This enables any clamping part that engages the clamping side 4" to be turned upside down to be reattached to the clamping side in an upside down position. Of course the same is true for any carriage engaging the rack side 4'.

The drive sheave 2 of the wire saw drives a movable endless saw wire 1 and to form a storage 9 for the movable endless saw wire 1 a plurality of saw wire storage sheaves 10, 12; 110, 112, 113; 212, 213; 312, 313 are provided mounted at least indirectly to the stand assembly 6, preferably at the clamping side 4" of the track 4. The embodiments of FIGS. 1-3, 7 shows a wire saw with a wire storage 9 that does not need to be rethreaded during operation of the wire saw, whereas in the embodiment shown in FIGS. 8-13, the wire storage 9 is normally rethreaded during operation of the wire saw. However it is also possible to arrange the upper or preferably the lower sheave/s 312, as shown in FIG. 14, movable along the rack 4. So the embodiments acc. to FIG. 8-14 can be arranged, so that rethreading is avoided.

Figure 2:
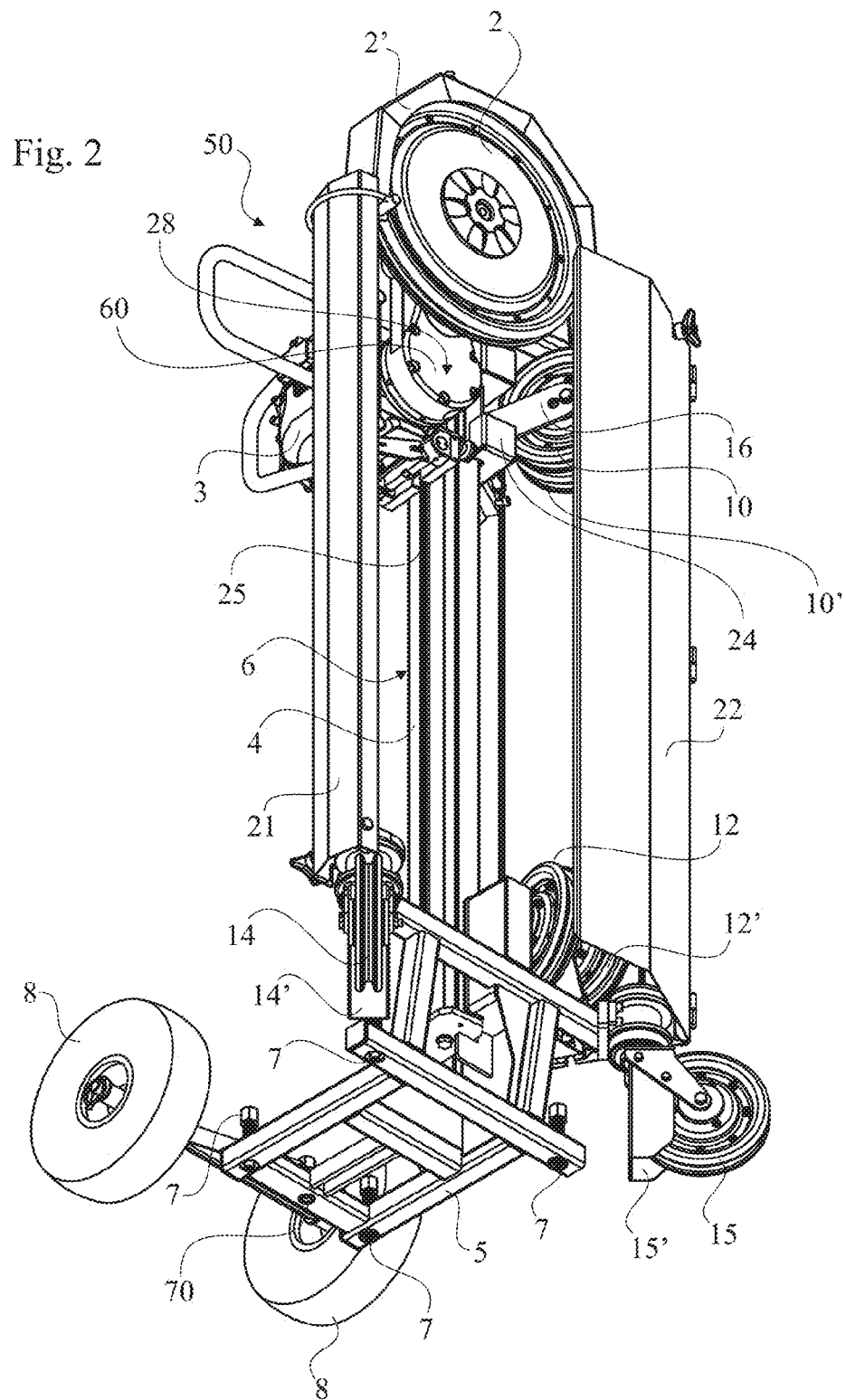
FIG. 2 is a perspective view of the wire saw of FIG. 1 with the saw wire removed for greater clarity, but provided with transportation wheels and saw wire shields and viewed at an angle from below.

The base 5; 205; 305 of the stand assembly 6 is plane and has a plurality of leveling screws 7, in the shown embodiments four, for leveling the base 5; 205; 305 on an uneven surface such as a floor, a wall or a ceiling, and at least one anchor bolt 70 for securing the base 5; 205; 305 to the surface. As illustrated in FIG. 2, the base 5 at its rear side can be provided with a pair of transportation wheels 8 for moving the wire saw to another location. The wheels 8 can be lifted from contact with the floor or other supporting structure, when securing or leveling the base 5.

Figure 10:
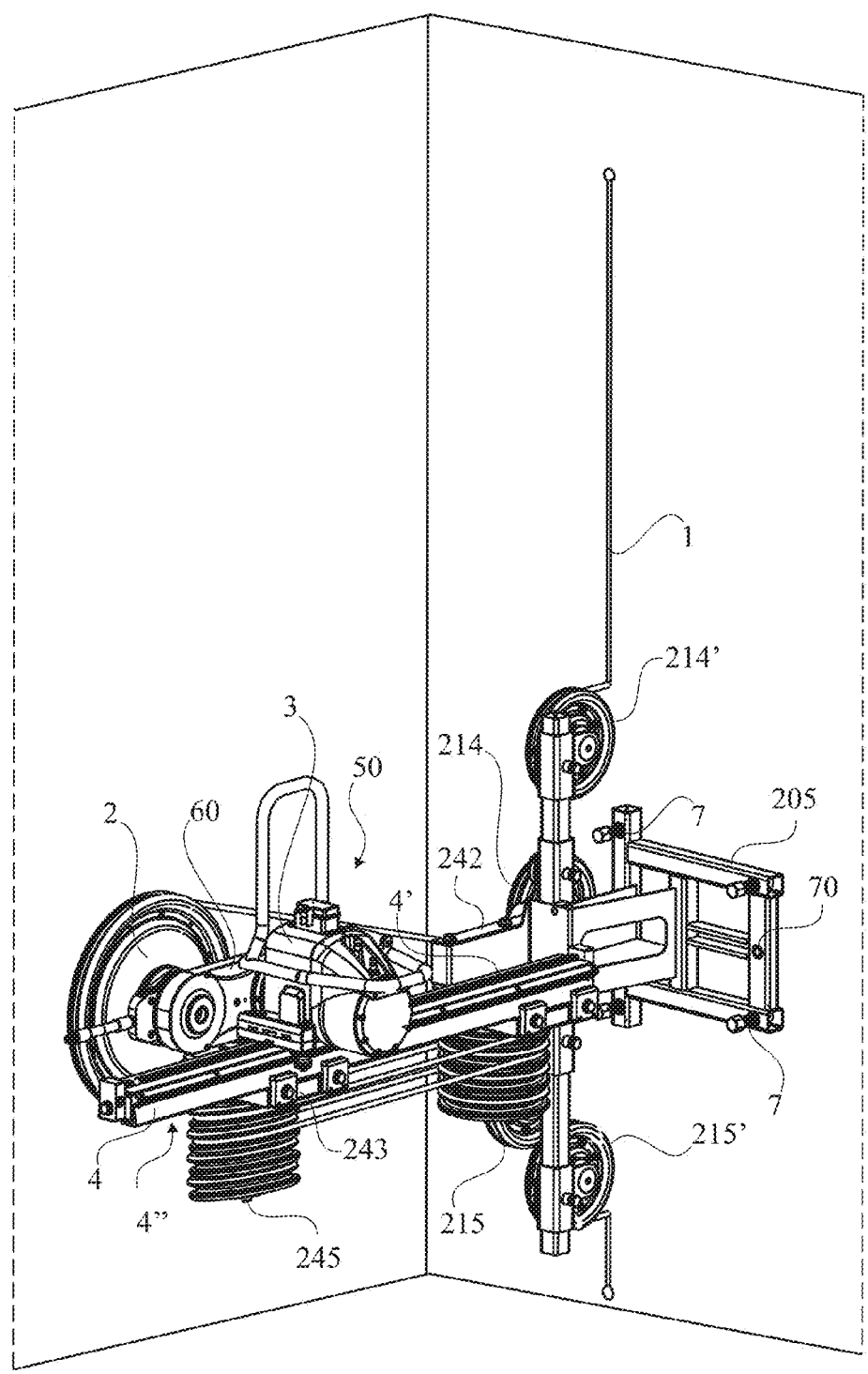
FIG. 10 shows the third embodiment being secured to a wall in a left hand configuration.
Figure 11:
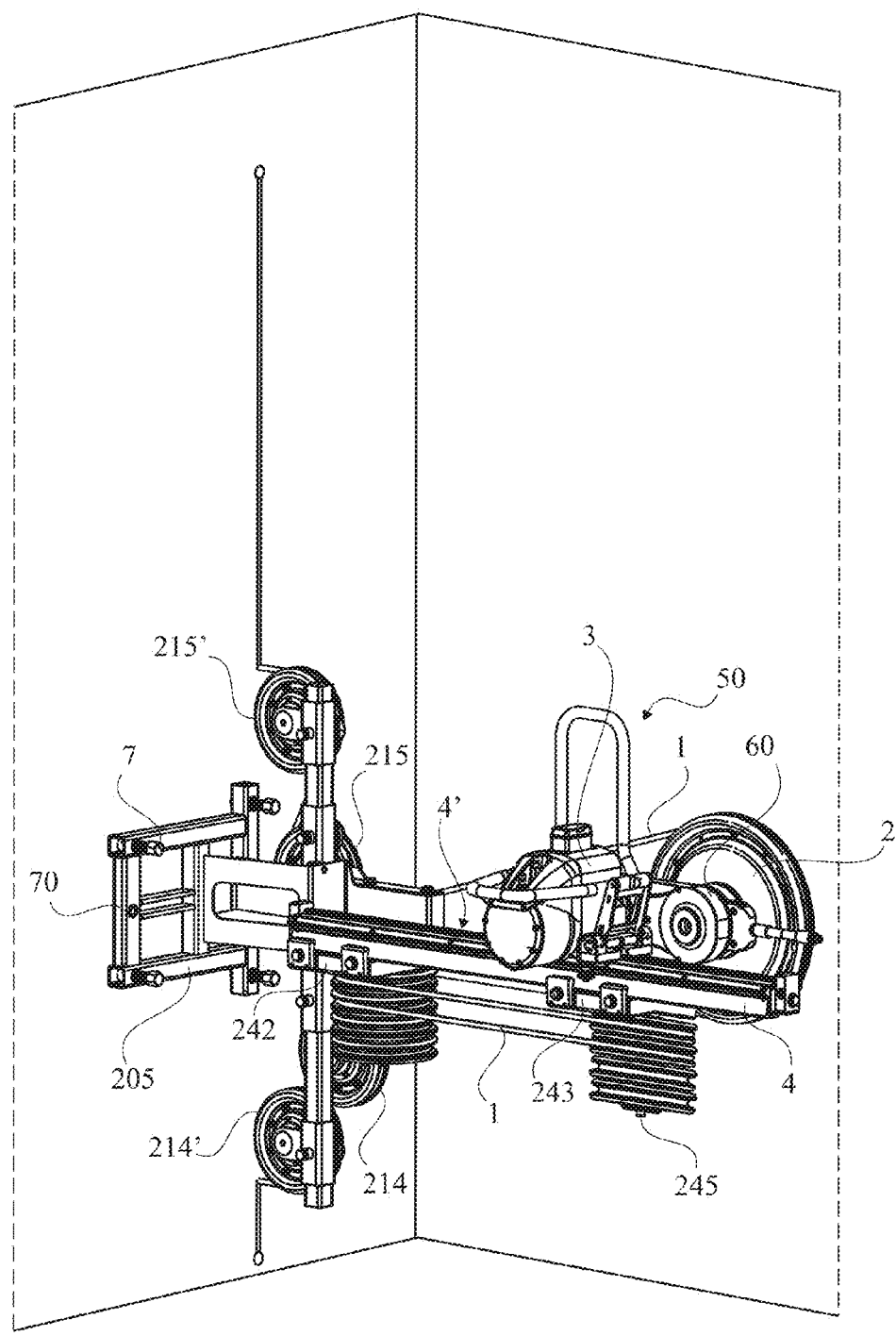
FIG. 11 shows the third embodiment being secured to a wall in a right hand configuration.

The object to be sawed may be located beside, below or above the wire saw, e.g. part of a wall, a floor or a ceiling, respectively. The wire saw is of course suitably fastened not to move under the forces of the saw wire. In the present description, when using directional terms for such as upper, lower, top, bottom, left, right, front, behind in the description they should be interpreted as if the wire saw was seen from a position facing the viewer in an upright position with the drive sheave 2 and guide sheaves 14, 15; 214, 215 closest to the viewer, and the base 5; 205; 305 secured or leveled to a substructure such as a floor, as e.g. in FIGS. 1, 7, 9 and 14. However, it should be noted that the base 205 can also be secured to a wall as e.g. is shown in FIGS. 10 and 11.

Figure 5:
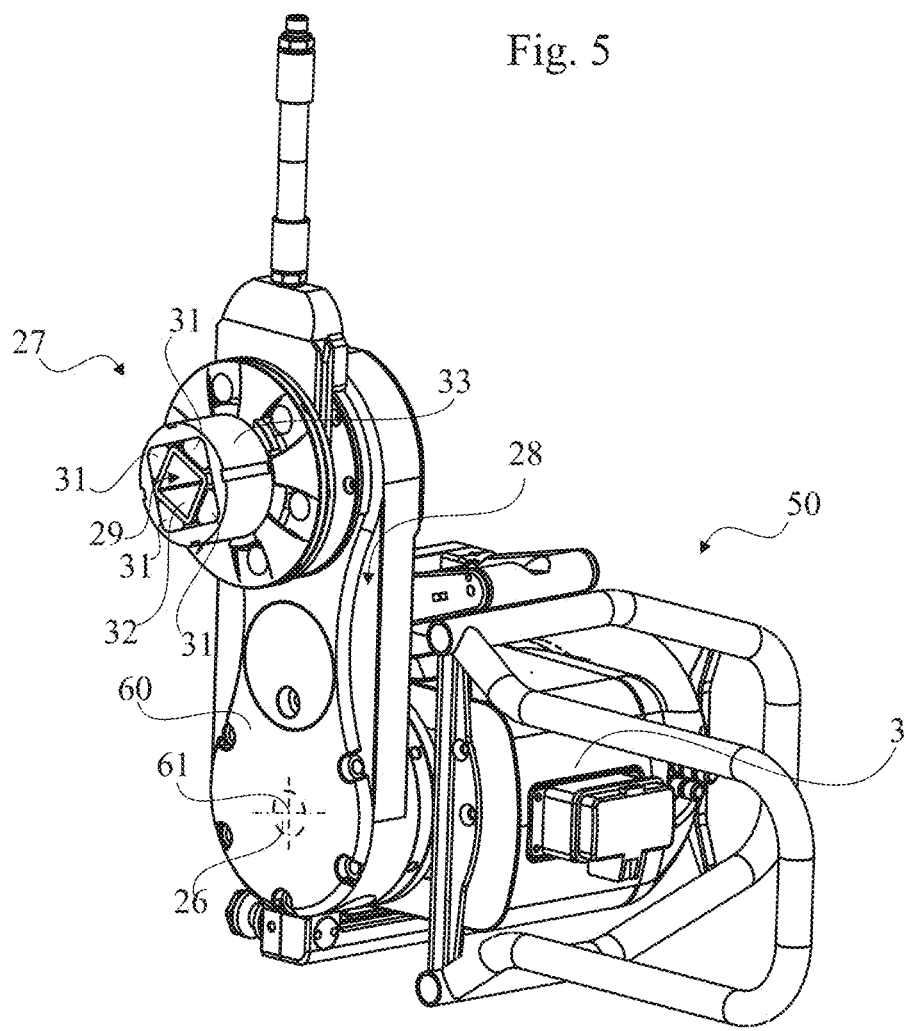
FIG. 5 is a perspective view of a drive unit of the wire saw, including a motor, a pivotable arm housing a transmission, and a torsion suspension device on the transmission output shaft to which the drive sheave can be mounted.

The drive unit 50 is best seen in FIGS. 3 and 5. A motor output shaft 26 of the motor 3 connects to a first gear wheel or pulley (not shown) of the transmission 28 housed in the pivotable arm 60, and last gear wheel or pulley (not shown) of the transmission 28 connects to a transmission output shaft 29. The pivotable arm 60 housing the transmission 28 is pivotable around a pivot 61, coinciding with axial centre of the motor output shaft 26. The pivotable arm 60 can be pivoted to point in an opposite direction, i.e. at least it can be pivoted 180 degrees, which enables the wire saw to be reconfigured between a left-hand configuration and a right-hand configuration as will be described in relation to FIG. 10-13.

When operating a wire saw tension variations, e.g. whips or jerks in the saw wire, may increase wear and shorten the life of the saw wire. Such tensions may occur when the saw wire comes into contact with an area of other density or hardness in the object to be sawed than surrounding areas, e.g. stones or reinforcement bars in concrete. According to a preferred embodiment, shown in FIGS. 5 and 6, such tension variations can be handled by connecting a transmission output shaft 29 to the drive sheave 2 via a torsion suspension device 27. Such a torsion suspension device 27 can be used for many different wire saws, including the ones shown in FIGS. 1-3, 7, 8-14.

Figure 6:
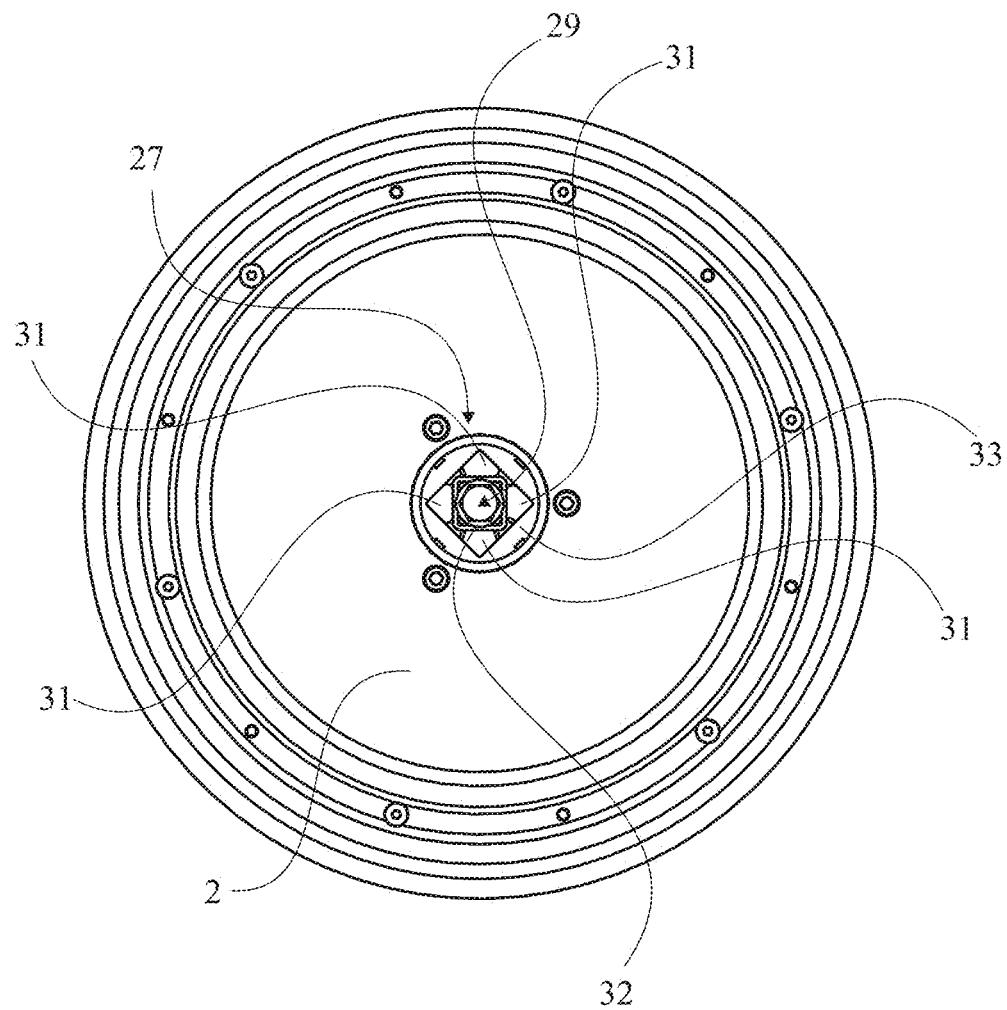
FIG. 6 shows a drive sheave with a torsion suspension device.

The torsion suspension device 27 shown in FIGS. 5 and 6 is an elastic coupling that includes an inner torsion suspension coupling member 32, a coaxial surrounding outer torsion suspension coupling member 33 and at least one elastic torsion suspension element 31. The at least one elastic torsion suspension element 31 is preferably made of rubber. The inner torsion suspension coupling member 32 has cross section with squared outer shape and the outer torsion suspension coupling member 33 has a cross section with squared inner shape. Relatively to one another, the squared outer shape of the inner torsion suspension coupling member 32 is rotated 45° in relation to the squared inner shape of the outer torsion suspension coupling member 33. The at least one elastic torsion suspension element 31 are provided in each one of four spaces formed between the two torsion suspension coupling members 32, 33, so that upon rotation of the inner torsion suspension coupling member 32 in relation to the coaxial surrounding outer torsion suspension coupling member 33 becomes more squeezed between the two torsion suspension coupling members 32, 33 and tries to move them back to a neutral position, i.e. a position having a minimum element 31 squeeze. The torsion suspension device 27 can be used for all the embodiments described below, but of course also for other kinds of wire saws using a motor 3 connected to a drive sheave 2 for driving the saw wire 1. The simplicity of the construction of the torsion suspension device 27 is particular advantageous in a dust-laden environment caused by sawing in concrete. The described torsion suspension device 27 has another advantage; it handles tension variations in the same manner regardless of the moving direction of the wire 1, i.e. it enables tension handling regardless of sawing direction. This is a distinct advantage when changing from a left hand to a right hand configuration, as this preferably done by changing direction of rotation.

In a first embodiment shown in FIG. 1-4, to form a storage 9 for a movable endless saw wire 1 driven by the drive sheave 2, a plurality of saw wire storage sheaves 10, 10', 12, 12' are provided mounted at least indirectly on the stand assembly 6. The storage 9 includes at least one displaceable storage sheave 10, 10' and at least one fixed storage sheave 12, 12'. FIG. 3 shows how the motor 3 with drive sheave 2 is fastened to the motor carriage 25. This carriage has 4 rollers 25a, two hidden, for rolling along the track 4. A clamping carriage 24 holds the at least one displaceable storage sheave 10, 10' in a biased or non biased way, as will be described. The clamping carriage can be locked in different locations along the track 4. As shown the carriage 24 contacts a dove tail-shaped grove so that it will not fall off the track when unclamped. An important feature is that the two carriages 24, 25 do not interfere with each over. Therefore both carriages can take use of the full free length of the track 4. It is possible to use a lift aid for lifting the clamping carriage 24 to a new higher position along the track 4. A permanently attached gas spring could be used as lift aid. It is significantly easier to include such a helping feature into this design than into a rethread design as acc. to EP 0 904 907. This is another important advantage. Further, two swivel guide sheaves 14, 15 are provided, one 14 for guiding the saw wire 1 at a position between the drive sheave 2 and an object to be sawed, not shown, and the other 15 for guiding the saw wire 1 at a position between the object to be sawed and the saw wire storage 9. Of course, when the base 5 is supported or secured to a structure such as a floor or wall, the swivel guide sheaves 14, 15 have no contact with the floor or wall. Further, instead of using the swivel guide sheaves 14, 15, non-swivel guide sheaves 214, 215 as shown in FIGS. 8-13 could be used, which will be described further down in relation to the embodiment of FIGS. 8-13.

The at least one displaceable storage sheave 10, 10' is directly or indirectly attached to the track 4 and displaceable in an essentially axial direction of the track 4 for adjusting a length of saw wire 1 in the storage 9. The saw wire 1 always wraps all of the storage sheaves 10, 10', 12, 12' during all sawing operations and no rethreading to include additional storage sheaves is necessary. Thus, the wire 1 never is transferred to wrap another storage sheave and thereby increase the length of saw wire 1 in the storage 9. Such a wire saw is compact and in addition to performing its function as wire saw it can be rebuilt easily to a wall saw, and the other way round.

Preferably, the at least one displaceable storage sheave 10, 10' is manually displaceable for attachment in an arbitrary position along the track 4, and is preferably a pair of storage sheaves 10, 10', which are mounted side by side and together displaceable in an essentially axial direction of the track 4. The at least one fixed storage sheave 12, 12' is preferably two fixed storage sheaves 12, 12' that are at least indirectly connected to the base 5, and said displaceable pair of storage sheaves 10, 10' is located essentially above the two fixed storage sheaves 12, 12'. Thereby, the height of the wire saw necessary for creating a sufficiently large saw wire storage may be reduced, which is an important advantage.

If desired, in an embodiment not shown, said at least one displaceable storage sheave 10, 10' may be fixed at least indirectly to the motor 3 and thereby indirectly to the track 4 for travelling with the motor 3 along the track 4. This is best described by referring to FIG. 3. The motor with drive sheave 2 is carried by the motor carriage 25. Said at least one displaceable storage sheave 10, 10' is carried by the clamping carriage. By joining the two carriages 24 and 25 into one common carriage the at least one displaceable storage sheave 10, 10' and the drive sheave 2 will move together. This big carriage would probably some extra rollers to take the increased pulling loads when moving. Thereby, the sawing may be continued for an extended period of time without interruption. With conventional wire saws, the sawing must be interrupted when the motor 3 has arrived at the end of the track 4, then the motor 3 must be returned to its starting point and the at least one displaceable storage sheave 10, 10' must be displaced toward the end of the track 4 to tension the slack of the saw wire 1, where after the sawing can be continued. In this context, these steps together are called a retake. Usually, the retake has to be made more than once. If said at least one displaceable storage sheave 10, 10' is fixed at least indirectly to the motor 3 for travelling therewith along the track 4, the travelling speed of the motor 3 will be reduced to about a third of the normal one to maintain the desired tension in the saw wire 1 by accumulating in the storage 9 the additional wire length created by the saw wire cutting through the object to be sawed.

All of the sheaves have a peripheral groove for the saw wire 1, and the saw wire contacting part of the groove is formed in a wear resistant material, such as rubber. The axially outer sides of the sheaves may be pressed sheetmetal. The increase in saw wire length to be stored in the storage as the saw wire gradually is cutting through the object to be sawed is taken up by the displacement of the motor 3 along the track 4.

As illustrated in FIGS. 1 and 3, at least one of the storage sheaves of the storage 9 is mounted on a sheave holding arm 16, which is pivotally attached to the track 4 adjustably in a direction along the track for adjusting a length of saw wire 1 in the storage 9. The sheave holding arm 16 is biased toward a neutral position. The pivotally attached sheave holding arm 16 can be used as compliment or optionally as an alternative to the torsion suspension device 27, so as to reduce possible tension variations in the saw wire 1 during sawing. However, it is preferred to have the torsion suspension device 27 between the motor 3 and the drive sheave 2 for reducing possible tension variations in the saw wire 1 during sawing.

Figure 4:
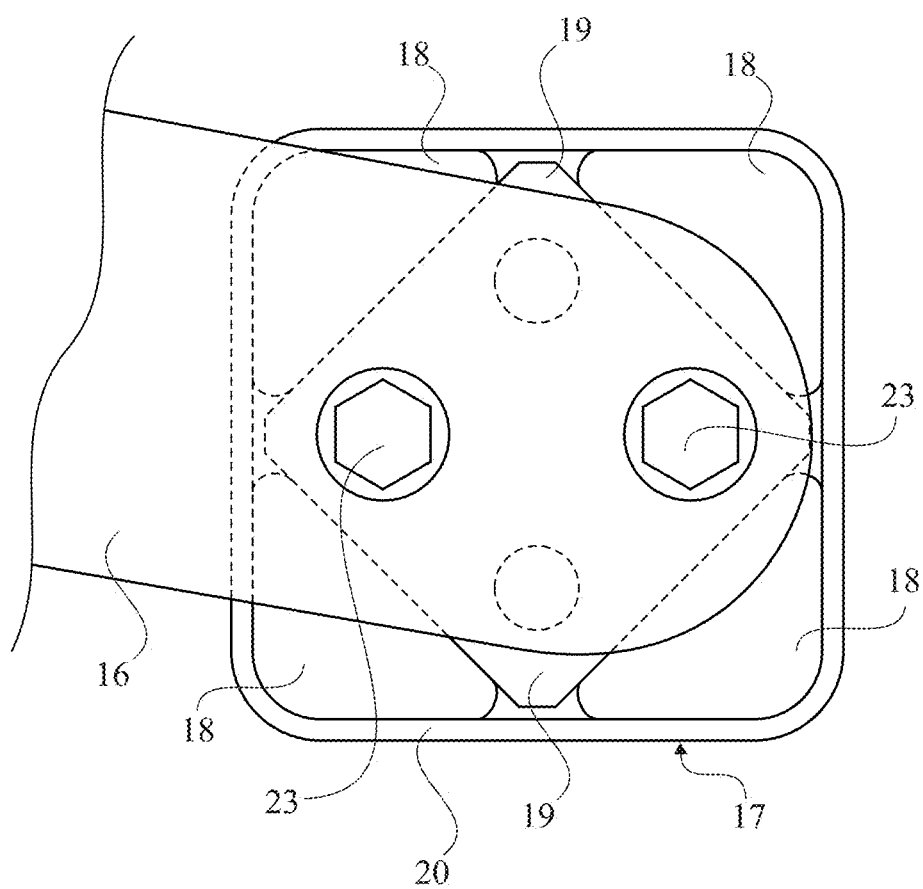
FIG. 4 is a simplified side view of an elastic mounting of a storage sheave carrying pivotal arm attached at the top of the track of the wire saw.

As can be seen in FIGS. 3 and 4, one end of the sheave holding arm 16 is resiliently connected to the track 4 by a coupling 17 including at least one elastic rubber element 18, which upon rotation of an inner coupling member 19 in relation to a coaxial surrounding outer coupling member 20 becomes elastically squeezed between to two coupling members and tries to move them back to a neutral position.

The inner coupling member 19 has cross section with squared outer shape and the outer coupling member 20 has a cross section with squared inner shape. Relatively to one another, the squared outer shape of the inner coupling member 19 is rotated 45° in relation to the squared inner shape of the outer coupling member 20. An elastic element 18, preferably made of rubber, is provided in each one of four spaces formed between the two coupling members. In the embodiment shown in FIG. 4 the sheave holding arm 16 is fixed by screws 23 to an axial end of the inner coupling member 19 of the coupling, but if desired it could alternatively be fixed to the outer coupling member 20, dependent on which one of the two coupling members is attached to the track 4. The position of the coupling 17 along the track 4 is adjustable to permit the saw wire 1 to extend around the object to be sawed. In the embodiment shown in FIG. 3, the coupling 17 is mounted on the track 4 by means of a clamping carriage 24 that is loosened and tightened manually. However, if desired, it is, of course, possible to attach the coupling 17 to the motor carriage 25 of the motor 3, so that the displacement of the motor 3 along the track 4 causes the coupling 17, the sheave holding arm 16, and said at least one storage sheave 10 carried thereby to be displaced as a unit.

The other, free end of the sheave holding arm 16 has shaft, on which at least one of the storage sheaves of the storage 9 is carried in bearings. In the preferred embodiment shown in FIG. 1, the at least one displaceable storage sheave 10, 10' is a pair of displaceable storage sheaves mounted side by side on the sheave holding arm 16. The other two fixed storage sheaves 12, 12' of the storage 9 are mounted on the base 5 at a distance from said pair of displaceable storage sheaves 10, 10' and at an angle to each other and to a rotation plane of the pair of displaceable storage sheaves 10, 10'. The saw wire 1 runs from the object to be sawed (not shown) around the left hand swivel guide sheave 14 in FIG. 1, up and around the drive sheave 2, down and around an first 12 of the fixed storage sheaves 12, 12' that is closest to the track 4, up and around a first 10 of the displaceable storage sheaves 10, 10' that is closest to the track 4, down and around a second 12' of the fixed storage sheaves 12, 12', up and around a second 10' of the displaceable storage sheaves 10, 10', down and around the right hand swivel guide sheave 15, and then back around the object to be sawed. Of course, it is possible, if desired, to expand the storage by using three or more displaceable storage sheaves and a corresponding number of fixed storage sheaves. The sheave holding arm 16 is shown as mounted in a slightly upward sloping position. Thereby, the normal tension in the saw wire during normal operating conditions will pull down the free end of the sheave holding arm 16 against the torsion force in the elastic coupling 17 to a generally horizontal position.

To protect operators in case of a possible break of the saw wire 1, a plurality of shields is provided as shown in FIG. 2. Each of the swivel guide sheaves 14, 15 is provided with a channel-shaped shield 14', 15', respectively, where the saw wire 1 follows the periphery of the sheave. The upper periphery of the drive sheave 2 is covered by a hood 2', the saw wire portion extending from the swivel guide sheave 14 to the drive sheave 2 is covered by a channel-shaped shield 21 open toward a vertical center plane of the saw, and on three vertical sides the storage is covered by a shield 22 that is open toward the vertical center plane of the saw.

In the first embodiment shown in FIGS. 1-4, the motor 3 with its drive sheave 2 and the displaceable storage sheave pair 10, 10' are shown in their positions at the end of a sawing operation, when the saw wire storage 9 is full, i.e. the displaceable storage sheave pair 10, 10' and the motor 3 are located at to the top of the track 4. At the beginning of a sawing operation, a large length of the saw wire 1 is drawn out of the storage 9 and wrapped around the object to be sawed, and the motor 3 and the displaceable storage sheave pair 10, 10' are at their lowermost positions, i.e. close to the base 5. During sawing, the motor 3 rises to the top of the track 4. Then the sawing is interrupted, the motor 3 is returned to its lowermost position, the clamping arrangement holding the coupling 17, the sheave holding arm 16 and the displaceable storage sheave pair 10, 10' is loosened, displaced upward along the track 4 to tighten the saw wire, and then tightened again. Then the sawing is started again. In this context, these steps together are called a retake. If necessary, these steps are repeated until the sawing through is completed.

In this embodiment, the saw wire 1 always wraps all of the storage sheaves 10, 10', 12, 12', and no rethreading to include additional storage sheaves is necessary. Then, preferably, at least one 10, 10' of the storage sheaves 10, 10', 12, 12' is displaceable along a major portion of the length the track 4. The major portion is either an upper portion or a lower portion of the track 4. Further, the at least one displaceable storage sheave 10, 10' is either manually displaceable for attachment in an arbitrary position along the track 4 as shown in FIGS. 1-3 or, in an embodiment not shown, fixed at least indirectly to the motor 3 for travelling therewith along the track 4. When the at least one displaceable storage sheave 10, 10' is manually displaceable for attachment in an arbitrary position along the track 4, the motor 3 and the clamp mounting of the at least one displaceable storage sheave 10, 10' are located on opposed longitudinal sides of the track 4 as is best shown in FIG. 3. Thereby, they do not interfere with each other upon independent displacement of them along the track 4. When, in an embodiment not shown, the at least one displaceable storage sheave 10, 10' is fixed at least indirectly to the motor 3 for travelling therewith along the track 4, e.g. the clamping carriage 24 may be devoid of its clamping ability and incorporated in the motor carriage 25, the travelling speed will be reduced to a third of the normal one to maintain the desired tension in the saw wire 1 by accumulating in the storage 9 the additional wire length created by the saw wire 1 cutting through the object to be sawed. If desired, this reduced displacement of the motor 3 may be accomplished with a separate motor or actuator, not shown. Then, equipment, not shown, may be provided for sensing the tension in the saw wire 1 caused by the rotation of the drive sheave 2 and for controlling the displacement of the motor 3 together with the drive sheave 2 and said at least one displaceable storage sheave 10, 10' along the track 4 in response to the sensed tension. When the at least one displaceable storage sheave 10, 10' is carried on a sheave holding arm fixed at least indirectly to the motor 3, the arm may be pivotally biased like sheave holding arm 16 or it may be fixed.

Figure 7:
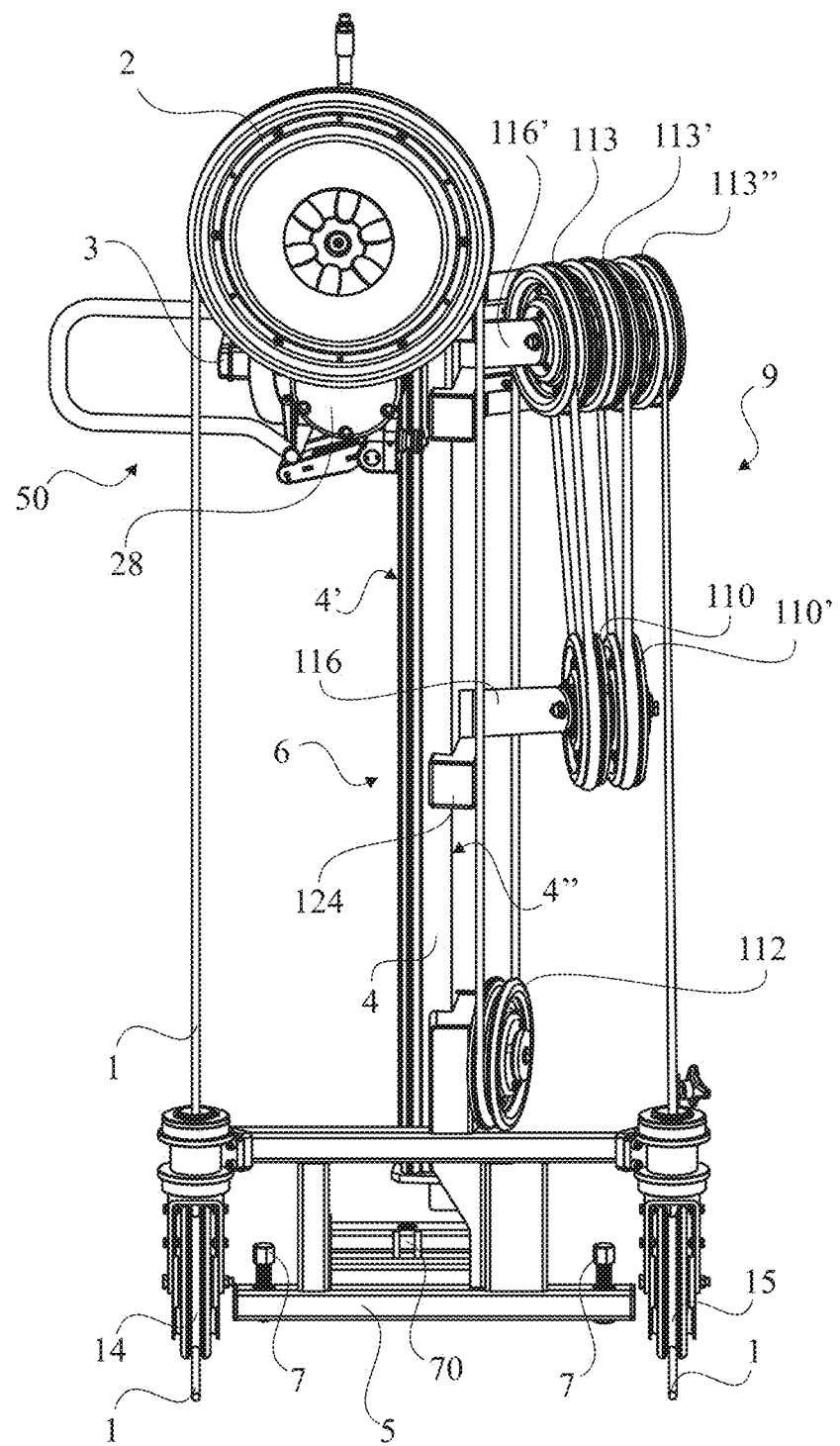
FIG. 7 is a front view of a second embodiment of a wire saw in accordance with the present invention and having a saw wire storage with at least one displaceable storage sheave located below at least one fixed storage sheave.

FIG. 7 shows a second embodiment of a wall saw rebuilt to a wire saw. In view of the great similarities with the wire saw described in relation to FIGS. 1-4, identical reference numbers will be used for identical components. The difference between the second embodiment shown in FIG. 7 and the first embodiment shown in FIGS. 1-4 is the saw wire storage 9. Components related to the wire storage 9 have the same numbering as similar or identical components in the first embodiment, but in the hundreds.

The wire storage 9 of FIGS. 7 and 14 has at least one displaceable storage sheave 110, 110'; 312 located below at least one upper fixed storage sheave 113, 113', 113"; 313 instead of above as of the embodiment described in relation to FIGS. 1-4. Further, the storage 9 of FIG. 7 includes a lower fixed storage sheave 112 fixed to the base 5 of the stand assembly 6 as in the first embodiment. In most other respects they have a similar design and offer similar advantages.

More precisely the displaceable pair 110, 110' of storage sheaves is carried by a lower sheave holding arm 116 mounted to a second displaceable clamping carriage 124. This carriage 124 is movable along the track 4 and is clamped in a suitable position, as described in the first embodiment for the corresponding first clamping carriage 24. The at least one upper fixed storage sheaves 113, 113', 113" is permanently locked in an upper position of the track 4 via an upper sheave holding arm 116'. In a first variant of the second embodiment both the upper sheave holding arm 116' and the lower sheave holding arm 116 are fixed, and not biased. In a second variant of the second embodiment the upper sheave holding arm 116' is fixed, and not biased. Instead the lower sheave holding arm 116 is biased to tension the at least two and preferably four parts of the wire entering and leaving the displaceable storage sheaves 110, 110'. In a third variant instead the lower sheave holding arm 116 is fixed and the upper sheave holding arm 116' is biased to tension the at least four and preferably six parts of the wire entering and leaving the fixed storage sheaves. So in the third variant more wire parts are tensioned than in the second variant. On the other hand this probably requires a stronger tensioning arrangement. In a forth variant both the upper sheave holding arm 116' and the lower sheave holding arm 116 are biased.

From the swivel guide sheave 15 the saw wire 1 extends upward, wraps the outermost fixed top storage sheave 113", then downward to wrap the outermost displaceable storage sheave 110', upwards to wrap the intermediate fixed top storage sheave 113', downwards to wrap the innermost displaceable storage sheave 110, upwards to wrap the innermost fixed top storage sheave 113, downwards to wrap the lower fixed storage sheave 112 that is fixed to the base 5, and finally upwards to wrap the drive sheave 2. In this way the wire is pulled from the swivel guide sheave 15 taking use of biasing feature of the storage 9, and this is a preferred way of operation. However it is also possible to draw the wire from swivel guide sheave 14, thanks to a special bearing arrangement of drive sheave 2. This double direction of rotation feature brings advantages under special occasions.

All four variants of the second embodiment have an advantage in common compared to the first embodiment. When the clamping of the second clamping carriage 124 is released the weight of the carriage and the displaceable storage sheaves 110, 110' will help to move the carriage 124 in the required direction downwards. In the first embodiment instead the first clamping carriage 24 should be moved upwards against the weight. This is an important advantage when the clamping to the track 4 is released and a retake as defined above is made. This advantage is additional to the possibility of accommodating a longer saw wire 1 in the storage 9 of FIG. 7 thanks to the increased number of storage sheaves.

FIGS. 8-13 show a third embodiment of a wall saw rebuilt to a wire saw. The wire saws of FIGS. 1-3, 7 have wire storages 9 that does not need to be rethreaded during operation of the wire saw, whereas in the wire saw shown in FIGS. 8-13, the wire storage 9 is normally rethreaded during operation of the wire saw. In view of the great similarities, identical reference numbers will be used for identical components. Components which are similar have been given the same numbering but in the two-hundreds. New components will also be numbered in the two-hundreds.

Here, the stand assembly 6 has a slightly different base 205 than that shown in FIGS. 1-2, 7. The base 205 is symmetrical to the left and right with base symmetry line 200. As can be seen in e.g. FIG. 9 a lower sheave holder 242 is secured to the base 205. The lower sheave holder 242 holds at least one lower fixed storage sheave 212, 212', 212", 212''', mounted on an lower sheave axle 244, each storage sheave being freely rotatable around their centre axle. The lower sheave holder 242 also holds the bottom portion of the track 4, by a clamping to it. The lower sheave holder 242 can be secured to the left 246 or to the right side 247 of the base 205 depending on if it is left or right hand configured as will be described below.

The base 205 has a transversally extending bar 211 mounted thereto, which can be transversally displaced. Thus, how much the bar 211 is protruding from each side, the left or the right side, of the base 205 can be varied. On the bar 211 guide sheaves 214, 215; 214,214', 215, 215' can be mounted; preferably one (FIGS. 8-9) or two (FIGS. 10-13) at each side of the base 205. The guide sheaves 214, 215; 214,214', 215, 215' do not have a swivel joint as the swivel guide sheaves 14, 15 shown in FIGS. 1-2, 7. Instead the guide sheaves 214, 215 are aligned with the drive sheave 2 as well as the transversal extension of the bar 211, and are each mounted on a pivotable guide sheave arm 240, 241; 240,240', 241, 241'. Each pivotable guide sheave arm 240, 241; 240,240', 241, 241' can be displaced along the bar 211, and each guide sheave arm 240, 241; 240,240', 241, 241' can be rotated 360 degrees in the plane of the drive sheave 2, and be locked at different angles. Hence, the guide sheaves 214, 215; 214,214', 215, 215' can be arranged in many positions by pivoting the guide sheave arms 240, 241; 240,240', 241, 241' and displacing them along the bar 211. For instance they can be pivoted in front of the base 205.

An upper sheave holder 243 is clamped above the lower sheave holder 242 at an upper portion of the track 4. The upper sheave holder 243 holds at least one upper fixed storage sheave 213, 213', 213", 213''', mounted on an upper sheave axle 245, each storage sheave being freely rotatable around their centre axle. The upper sheave holder 243 is slightly tilted so the upper fixed storage sheaves 213, 213', 213", 213''' also becomes slightly tilted towards the left. Thereby they can be arranged so that the back side of the first and innermost upper storage sheave 213 is straight above the backside of the first and innermost lower storage sheave 212, and the front side of the first upper storage sheave 213 is straight above the front side of the second innermost lower storage sheave 212', which backside is straight below the backside of the second innermost upper storage sheave 213', etc. I.e. the tilt enables the wire to easily thread new pairs of storage sheaves 212, 212; 212', 213'; 212", 213"; 212''', 213'''.

Figure 8:
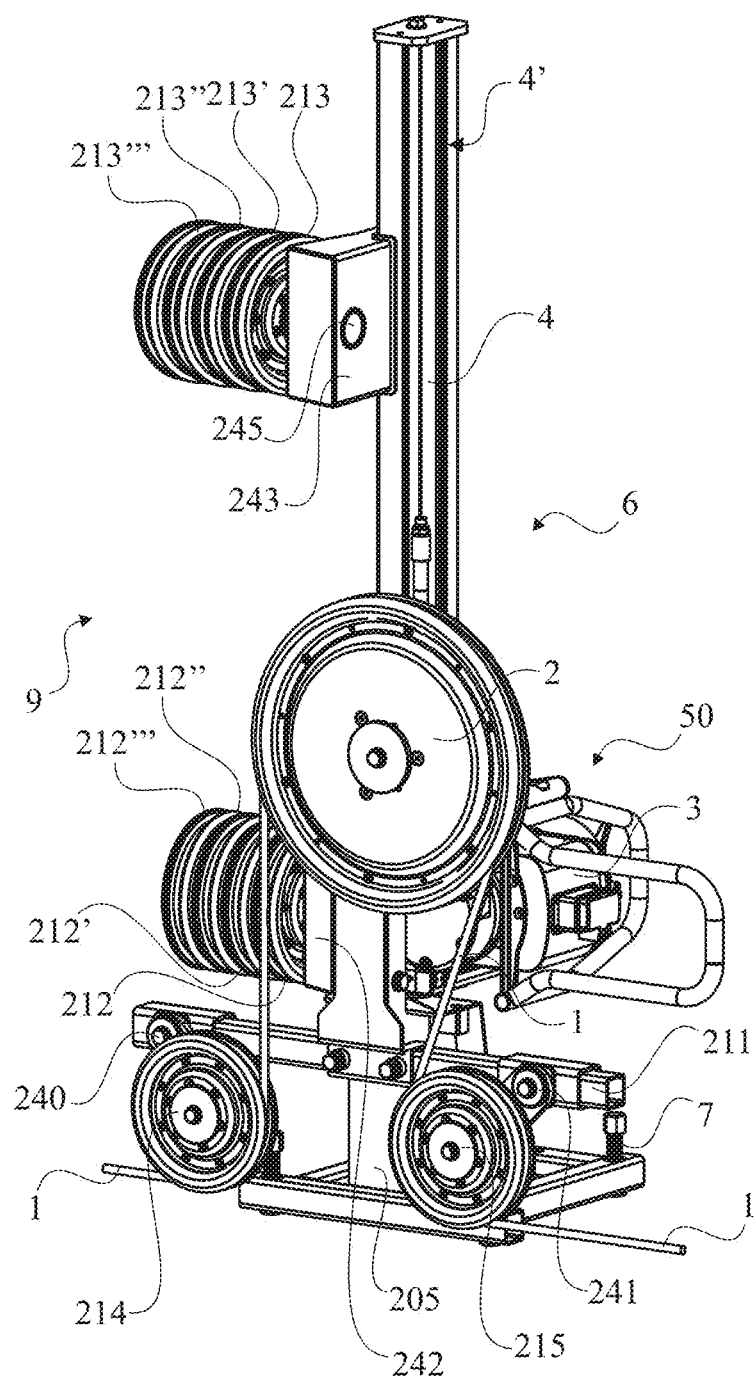
FIG. 8 is a perspective view of a third embodiment of a wire saw having a saw wire storage with at least one fixed upper storage sheave and at least one fixed lower storage sheave, the wire saw being in a starting position.
Figure 9:
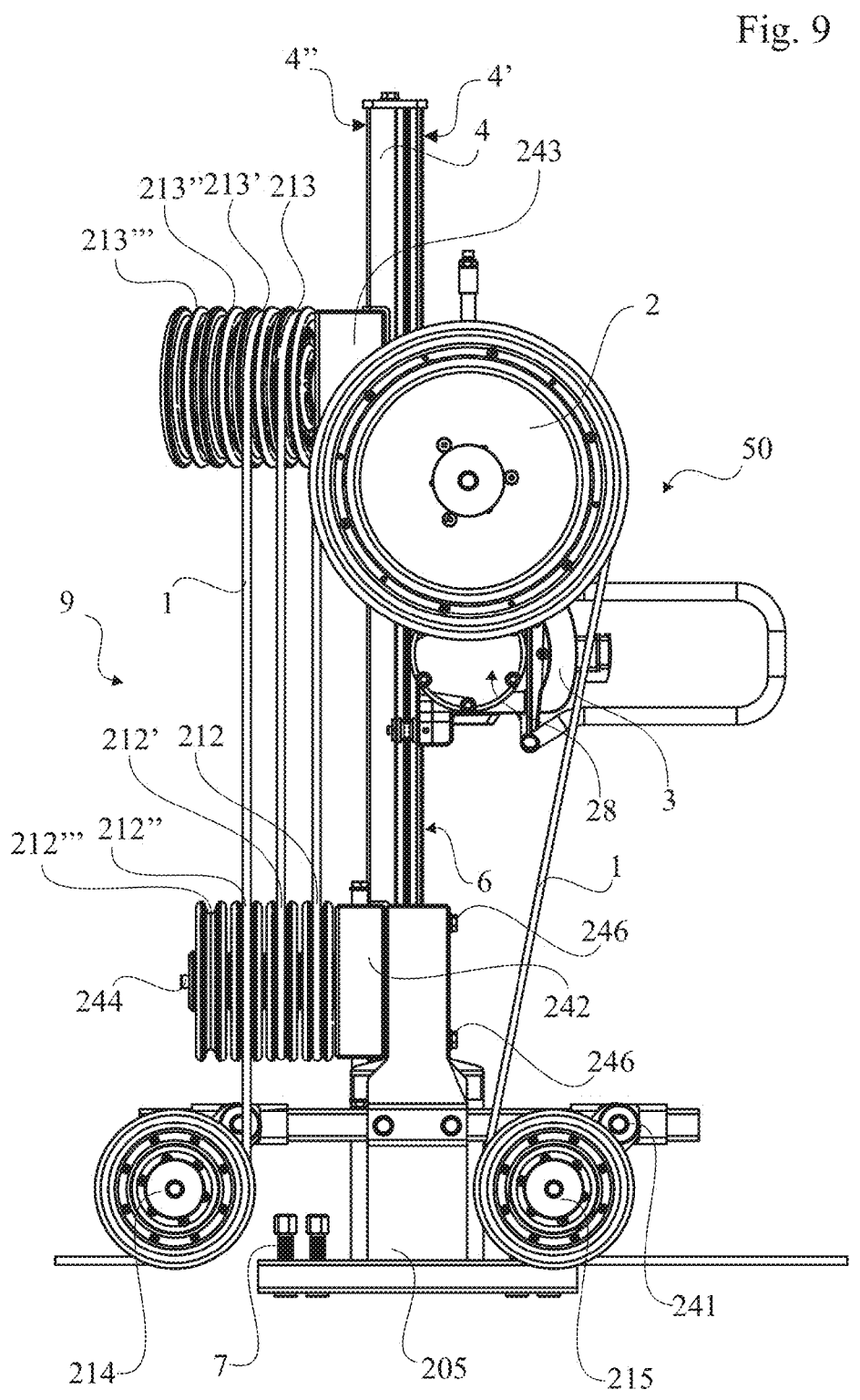

In this embodiment the saw wire will be rethreaded during the sawing process. FIG. 8 shows a possible starting position where only the guide sheaves 214, 215 are used, i.e. none of the fixed storage sheaves 212, 212', 212", 212''', 213, 213', 213", 213''' of the wire storage 9 are threaded, and thus the usable length of the saw wire 1 is at its maximum. From the position shown in FIG. 8 the motor carriage 25 with the motor 3 and drive sheave 2 climbs the track 4 as the sawing is progressing. When the motor carriage 25 has reached the top of the track 4, the sawing process is halted. Thereafter the motor carriage 25 is moved back to the base 205 of the stand assembly 6, so that the saw wire 1 can be threaded so that from the left side of the drive sheave 2 the wire is drawn to engage at the front side of the first and innermost lower storage sheave 212 and around, where after the wire from the back side of the first lower storage sheave 212, goes up to the backside of the first and innermost upper storage sheave 213 and around, and thereafter from the front side of the innermost upper storage sheave 213 down to a first 214 of the guide sheaves 214, 215, which can be adjusted in its transversal position with respect to the rethreading. In the position shown in FIG. 9 the motor carriage 25 has been up and down twice times more, and each time a new pair of upper and lower storage sheaves 212', 213'; 212", 213" has been threaded. Continuing the process from FIG. 9, the motor carriage 25 would once more reach the top of the track 4, where after the motor carriage 25 can be moved back to the base 205 of the stand assembly 6 and the last pair of upper and lower storage sheaves 212''', 213''' could be threaded, and the first guide sheave 214 can be adjusted by pivoting the guide sheave arm 240 or displacing it along the bar 211. A second 215 of the guide sheaves 214, 215 guides the wire 1 from the right side of the drive sheave 2.

The wire saw can be rebuilt to a between a left-hand configuration (se e.g. FIG. 10, 13, i.e. the motor 3 and the drive sheave 2 on the left-hand side and the wire storage 9 on the right hand side) and a right hand configuration (se e.g. FIG. 11, 12, i.e. the motor 3 and the drive sheave 2 on the right hand side and the wire storage 9 on the left hand side). Thus, the wire storage 9 and the motor 3 with the drive sheave 2 can shift between the left hand side and the right hand side of the stand assembly 6, while they are kept in the same relative back and forward position. In FIG. 10 the wire saw is arranged to saw on a wall close to a left corner (here, direction in relation to the figure), whilst the wire saw in FIG. 11 has been rebuilt to saw on a wall close to a right corner (direction in relation to the figure). As can be seen in both configurations the front side of the wire saw have been arranged to face the opposing corner wall so that the wire 1 can cut close to the corner. Of course looking at FIG. 10 it would be possible to turn the entire wire saw 180 degrees without reconfiguration of it. In such case however the motor 3 would come to hang below (here direction in relation to the figure) the track 4 and it would be more exposed to dust from the sawing operation. Thus, one advantage with re-configuring the saw is that the wire saw can cut close to corners while horizontally mounted without exposing the motor 3 to more dust from the sawing operation.

Figure 12:
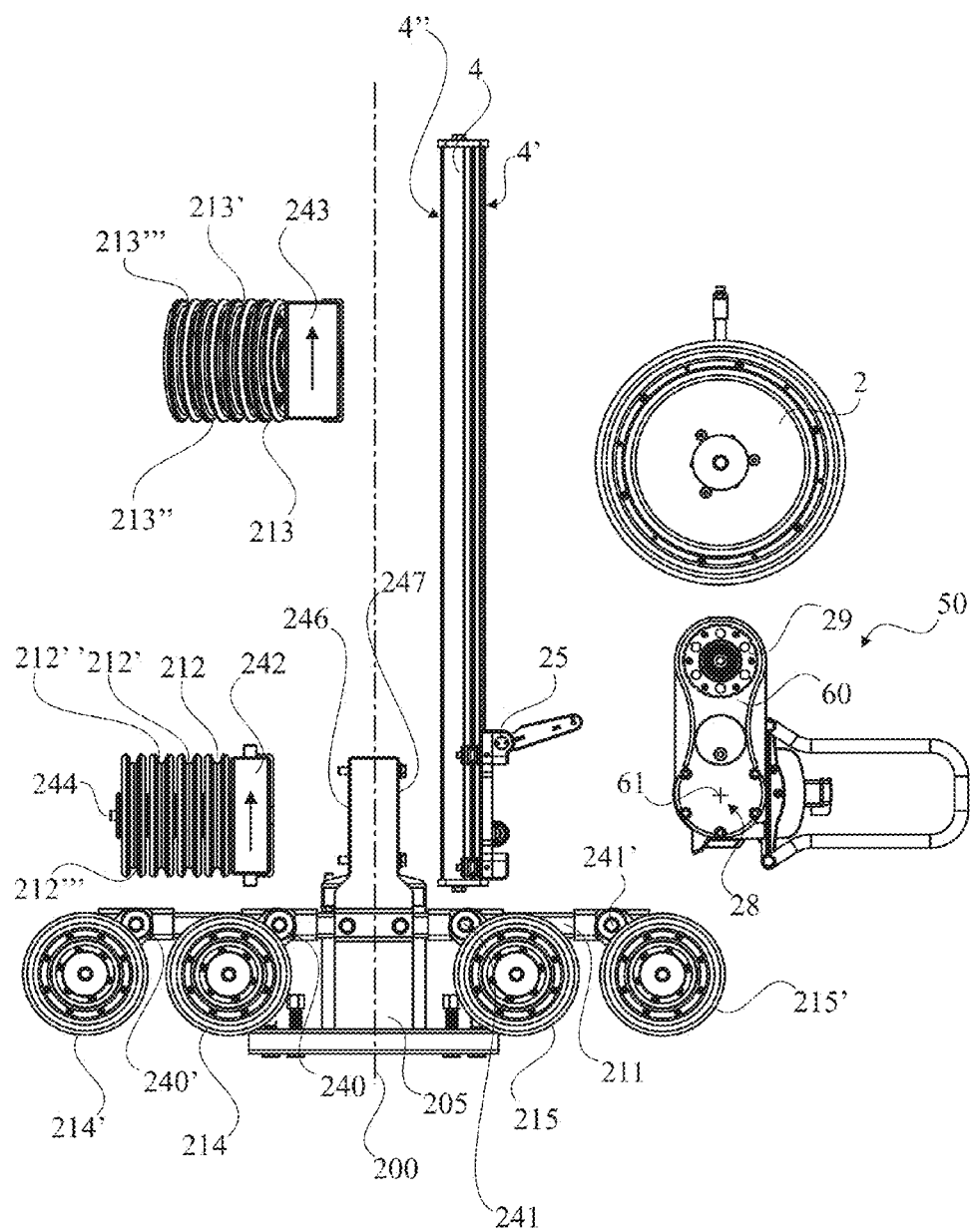
FIG. 12 shows an exploded view of the third embodiment ready to be assembled to a right hand configuration.
Figure 13:
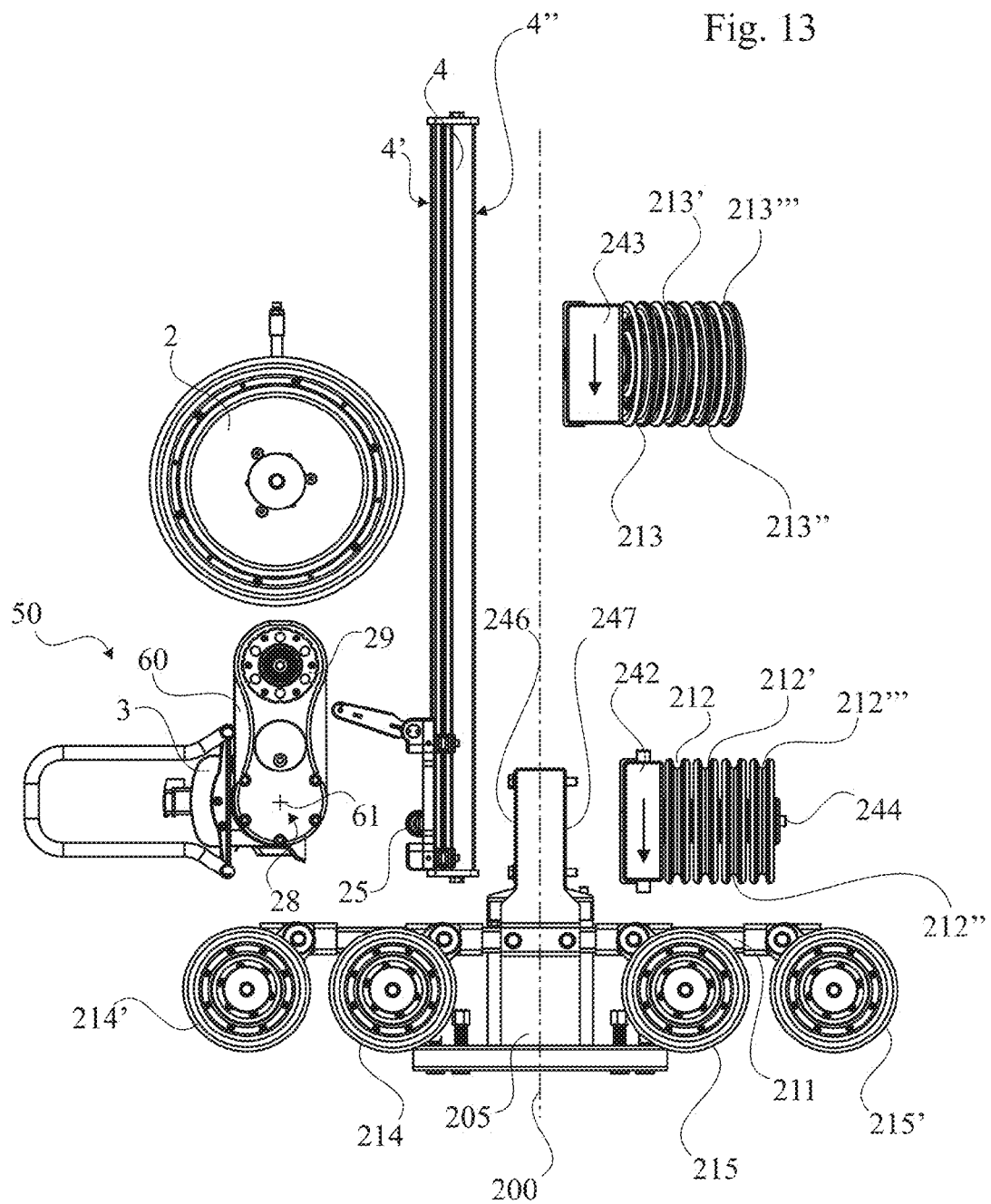
FIG. 13 shows an exploded view of the third embodiment ready to be assembled to a left hand configuration.

Turning to FIGS. 12 and 13, when rebuilding the wire saw from a right hand configuration (FIG. 12) to a left hand configuration (FIG. 13), the saw wire 1 is firstly unthreaded from the drive sheave 2 and any engaging upper or lower fixed storage sheaves 212, 213. Thereafter, the upper sheave holder 243 is disengaged from track 4, the drive unit 50 is disengaged from the motor carriage 25, and the track 4 is disengaged from the lower sheave holder 242, which is disengaged from the base 205. The lower sheave holder 242 is thereafter turned upside down and secured to the opposite side of the base 205 as seen in the figure (the arrow shown on the lower sheave holder 242 indicating that it has been turned upside down). The track 4 is then turned 180 degrees around its longitudinal axle so that the rack side 4' of the track shifts from pointing to the right to pointing to the left, whereafter it can be secured to the lower sheave holder 242 by clamping. The upper sheave holder 243 is also turned upside down and moved and is reattached to the clamping side 4" of the track 4 (the arrow shown on the lower sheave holder 242 indicating that it has been turned upside down). The drive unit 50 is also turned upside down to be reattached to the motor carriage 25 on the rack side 4' of the track 4, and its pivotable arm 60 is pivoted 180 degrees so that it points upwards again (i.e. to compensate for the 180 degrees rotation of the motor 3). The quick connection allowing it to be placed in both directions. The wire can now be rethreaded to the drive sheave 2 and optionally any number of storage sheaves 212, 212', 212", 212''', 213, 213', 213", 213''' depending on desired wire length. Everything unchanged, the wire 1 would now run in the opposite direction when starting the motor 3, but preferably the motor is of a kind that can shift direction, i.e. being able to operate at both directions. For instance by having an electric motor where the poles are shifted to change driving directions. Such a motor is e.g. used in the wall saw Husqvarna WA 440HF by Husqvarna AB.

Alternatively the one or both of the sheave holders 242, 243 could be displaceable along the track 4. If the lower sheave holder 242 is to be displaceable, the track 4 can be secured directly to the base 205.

A forth embodiment will now be described in relation to FIG. 14. Here the wire storage 9 at least one upper storage sheave 313 mounted on an upper pivotable sheave holder 343 and at least one lower storage sheave 312 mounted on a lower pivotable sheave holder 342. The at least one upper storage sheave 313 is tilted in the same manner as the upper storage sheaves 213 described in relation to the third embodiment, i.e. they are pointing to the left as in FIG. 12 or to the right as in FIG. 13.

The upper pivotable sheave holder 343 is pivotably secured to the clamping side 4" and can be pivoted 180 degrees, shifting between two positions, a right hand configuration position, as shown in the figure, and a left hand configuration position. The two positions provided by the upper support members 354a (when pointing to the right in FIGS. 14) and 354b (when pointing to the left in FIG. 14). Preferably the upper pivotal arm 356 is secured at or close to the top of the track 4.

The lower pivotable sheave holder 342 is pivotably secured to a displaceable clamping device 355 and can be pivoted (here at a pivot angle shown to be around 30 degrees) between two positions, a right hand configuration position (as shown in the figure) and a left hand configuration position. The two positions provided by the lower stop members 352a and 352b and a spring biased support 353 that keeps the lower pivotable sheave holder 342 in one of its two positions when the storage sheaves 312, 313 are unthreaded. The spring biased support 353 is pushed in when moving the lower pivotable sheave holder 342 from the right hand configuration position (i.e. pointing towards lower right in the figure) to the left hand configuration position (i.e. pointing towards lower left in the figure). The displaceable clamping device 355 can be displaced along the track 4.

The track 4 is here mounted directly to the base 305 via a central pin 351 engaging a matching hole in the bottom of the track. The track 4 can be rotated 180 degrees around its axle between a right hand configuration position (as shown in the figure) and a left hand configuration position. The track 4 is locked to the base 305 in respectively position by a locking sprint 357, but of course other means for locking the track 4 to the base 305 can be used.

Shifting between a right hand configuration and a left hand configuration the wire is first unthreaded from the drive sheave 2 and any engaging storage sheave 312, 313. The locking sprint 357 is removed and the track 4 is rotated 180 degrees around its axle, i.e. from its right hand configuration position to its left hand configuration position. The lower and upper pivotable sheave holders 342, 343 are also pivoted from their right hand configuration positions to their left hand configuration positions. The drive unit 50 is arranged upside down and its pivotal arm 60 is pivoted 180 degrees so that it points upward even after being arranged upside down. The pivotal arm 60 is primarily used for determining the cutting depth in the wall saw application. For the wire saw applications it is not necessary. A fixed gear box is possible. The difference between the left hand configuration and the right hand configuration is evident by comparing FIGS. 12 and 13.

Whereas the invention has been shown and described in connection with the preferred embodiment thereof it will be understood that many modifications, substitutions, and additions may be made which are within the intended broad scope of the following claims.

For instance, the torsion suspension device 27 shown in FIGS. 5 and 6 could alternatively be arranged to connect the motor output shaft 26 to a first gear wheel or pulley (not shown) of the transmission 28 housed in the pivotable arm 60, or arranged to connect a last gear wheel or pulley (not shown) of the transmission 28 to the transmission output shaft 29. It would also be possible to use two or more torsion suspension devices 27 in any combination of the suggested positions, even though it is preferred to only use one torsion suspension device 27.

Further, it would also be possible to have a track 4 with a same clamping and rack side, i.e. enabling the wire storage 9 and drive unit 50 to easily switch side on the track 4. In such case the track 4 wouldn't need to be turned when re-configuring between left hand and right hand configurations.

The transmission 28 may e.g. be of a kind using a plurality of cooperating gear wheels as e.g. used in the model Husqvarna WS 440 HF from Husqvarna AB. Of course other kinds of transmission could be used, for instance, belt connected pulleys.

Alternatively the drive unit 50 can be secured to the carriage 25 by a rotatable connection, i.e. so that it can be rotated without removing it from the track 4. Here the drive unit 50 wouldn't need to be fully detached from the track 4 when turning it upside down.

The drive unit may also be of a kind not having an arm 60 rather having the drive sheave 2 essentially coaxial with the motor output shaft.

The wire saw shown in FIGS. 1-13 can be rebuilt from a wall saw. When used as a wall saw the base 5; 205; 305 is not used. Instead the track 4 is clamped to the wall and the drive unit 50 runs on the saw rail or rack side 4' of the track. Suitable wall saws are for instance the models Husqvarna WS 440 HF, and Husqvarna WS 463 from Husqvarna AB. Husqvarna WS 440 HF has an electric motor, while the motor of Husqvarna WS 463 is a hydraulic one. Of course, it is within the skill of an ordinary craftsman to rebuild also other wall saws by using the teachings of the present invention.

INDUSTRIAL APPLICABILITY

Construction machinery is used in renovating, reconstructing and extending buildings, for example. Wall saws and wire saws are used for cutting and extending openings for doors, windows and light wells, etc., corrective work on facades, partition walls and garden walls, etc., and controlled demolition of concrete. For certain tasks, wire saws are preferable over wall saws.

The invention claimed is:

1. A wire saw having a drive unit including:
   a drive sheave for driving an endless saw wire, and
   a motor having a motor output shaft directly or indirectly connected to the drive sheave characterized in a at least one torsion suspension device, between the motor output shaft and the drive sheave, for dampening or absorbing torsion jerk/s to or from the endless saw wire,
   the torsion suspension device comprises an elastic coupling including:
   an inner torsion suspension coupling member,
   a coaxial surrounding outer torsion suspension coupling member, and
   at least one elastic torsion suspension element, between the inner torsion suspension coupling member and the outer torsion suspension coupling member, which at least one elastic torsion suspension element, upon rotation of the inner torsion suspension coupling member in relation to the coaxial surrounding outer torsion suspension coupling member becomes more squeezed between the inner and outer torsion suspension coupling members and tries to move them back to a neutral position, and
   wherein the inner torsion suspension coupling member has cross section with squared outer shape and the outer torsion suspension coupling member has a cross section with squared inner shape, the squared outer shape of the inner torsion suspension coupling member is rotated 45 degrees in relation to the squared inner shape of the outer torsion suspension coupling member, and wherein the at least one elastic torsion suspension element are provided in each one of four spaces formed between the inner and outer torsion suspension coupling members.

2. A wire saw as claimed in claim 1, wherein the motor is of a kind that can operate at both driving directions, preferably an electric motor where the poles are shifted to change driving direction.

3. A wire saw as claimed in claim 1 wherein the track is arranged to be patched or arranged to the base into at least two different positions, a first in which the rack side facing to the left and the clamping side to the right, and a second in which the rack side facing to the right and the clamping side to the left.

4. A wire saw according to claim 1 wherein the motor output shaft is connected to a transmission which has a transmission output shaft that is connected to the drive sheave via a first of the at least one torsion suspension device.

5. A wire saw as claimed in claim 4, wherein the transmission is housed in a pivotable arm which can be pivoted at least 180 degrees around a pivot which is essentially coaxial with the motor output shaft, preferably 360 degrees.

6. A wire saw according to claim 1 wherein the wire saw further includes a track for carrying the motor, the track rising from a base and forming therewith a stand assembly, and the motor and the drive sheave being displaceable along the track as the saw wire (1) is cutting, a plurality of saw wire sheaves are arranged to the stand assembly to form a storage for the saw wire (1), the storage including at least one upper storage sheave and at least one lower storage sheave arranged below the at least one upper storage sheave to the stand assembly.

7. A wire saw as claimed in claim 6, wherein the wire saw includes at least two guide sheaves carried by the stand assembly, one for guiding the saw wire at a position between the drive sheave and an object to be sawed, and the other for guiding the saw wire at a position between the object to be sawed and the saw wire storage.

8. A wire saw as claimed in claim 7, wherein the at least two guide sheaves is mounted on a pivotable guide sheave arm, which can be pivoted at least 120 degrees, preferably 360 degrees, in a plane essentially parallel to the plane of the drive sheave.

9. A wire saw as claimed in claim 6, wherein the wire saw can be configured in a left and right hand configuration, switching sides between the drive unit and the wire storage while keeping the same positions in the back and forward direction.

10. A wire saw as claimed in claim 6, wherein the track has a rack side to which the motor is attached to be movable along and a clamping side to which the storage sheaves can be directly or indirectly secured to, the rack side and the clamping side both being symmetrical.

11. A wire saw according to claim 6 wherein the at least one upper storage sheave or the at least one lower storage sheave being at least one displaceable storage sheave and the other being at least one fixed storage sheave, wherein the at least one displaceable storage sheave is directly or indirectly attached to the track and displaceable in an essentially axial direction of the track for adjusting a length of saw wire in the storage, and the saw wire wraps all of the storage sheaves of the storage during all sawing operations, so that the wire never is transferred to wrap another storage sheave/s and thereby increase the length of saw wire in the storage.

12. A wire saw as claimed in claim 11, wherein said at least one displaceable storage sheave is a pair of storage sheaves mounted side by side and together displaceable in an essentially axial direction of the track, that said at least one fixed storage sheave is one of two fixed storage sheaves that are at least indirectly connected to the base, and that said displaceable pair of storage sheaves is located essentially above the two fixed storage sheaves.

13. A wire saw as claimed in claim 11, wherein said at least one displaceable storage sheave is one storage sheave or preferably a pair of storage sheaves mounted side by side and displaceable in an essentially axial direction of the track, that said at least one fixed storage sheave is two storage sheaves or preferably three of the fixed storage sheaves that are at least indirectly connected to the track at an upper position thereof, and that said displaceable storage sheave/pair of storage sheaves is located essentially below the at least two fixed storage sheaves.

14. A wire saw according to claim 11, wherein said at least one displaceable storage sheave is fixed at least indirectly to the motor, preferably to a motor carriage, and thereby indirectly to the track for travelling with the motor along the track.

15. wire saw as claimed in claim 11, wherein said at least one displaceable storage sheave is mounted to be carried by an arm, which is pivotally and at least indirectly attached to the track adjustably in a direction along the track for adjusting a length of saw wire in the storage, and which is biased, so as to reduce possible tension variations in the saw wire.

16. A wire saw as claimed in claim 11, wherein at least one fixed storage sheave is mounted to be carried by an arm, which is pivotally and at least indirectly attached to the track, and which is biased, so as to reduce possible tension variations in the saw wire.

17. A wire saw as claimed in claim 16, wherein the arm is resiliently and at least indirectly connected to the track by a coupling including at least one elastic element, which upon rotation of an inner coupling member in relation to a coaxial outer coupling member becomes squeezed between two coupling members and tries to move them back to a starting position.

18. A method of re-configuring a wire saw between left and right side configurations, the wire saw having:
   a starting left or right side configuration wherein the left side configuration is symmetrically arranged relative to the right side configuration about a line of symmetry through a base,
   a track rising from the base and forming therewith a stand assembly,
   a drive unit including a saw wire drive sheave for driving an endless saw wire, and
   a motor being connected to drive the drive sheave, the drive unit being displaceable attached to a rack side of the track with the drive sheave positioned furthest from the base so that the drive unit can move along the track as the saw wire is cutting, and a storage for the saw wire including an upper sheave holder holding at least one upper storage sheave, being attached to an upper portion of the track at a clamping side opposite to the rack side and protruding from the clamping side at a first side thereof, and a lower sheave holder holding at least one lower storage sheave, being attached to a lower portion of the stand assembly at the opposite side, and protruding from the clamping side at a first side thereof,
   the method characterized by the steps:
   unthreading the saw wire from the drive sheave and any engaging storage sheaves;
   rotating the drive sheave 180 degrees relative to the motor from a starting position
   attaching the drive unit on the rack side with the drive sheave positioned furthest from the base,
   arranging the storage sheave holders to protrude from the clamping side at an opposite second side thereof,
   turning the track 180 degrees around its longitudinal axle in relation to the base,
   rethreading the saw wire to the drive sheave, and
   operating the wire saw in the right or left side configuration opposite the starting left or right side configuration.

19. A method according to claim 18 wherein the drive unit includes a pivotable arm connecting the motor to the drive sheave, the pivotable arm extending in a first direction essentially parallel to the track before arranging the drive unit upside down and after arranging the drive unit upside down in an opposite second direction, still essentially parallel to the track, and wherein the method comprising the step of pivoting the pivotable arm from the second position so that it again points in the first direction.

20. A method according to claim 18, wherein the upper and lower sheave holders are reattached at the same position at the clamping side but turned upside down.

21. A method according to claim 18, wherein the motor is run in the opposite direction after the wire saw has been re-configured.

22. A method according to claim 18 further comprising:
   engaging one or more storage sheaves depending on needed wire length.

* * * * *